US011783557B2

(12) United States Patent
Goldberg et al.

(10) Patent No.: US 11,783,557 B2
(45) Date of Patent: Oct. 10, 2023

(54) VIRTUAL TRY-ON SYSTEMS AND METHODS FOR SPECTACLES

(71) Applicant: WARBY PARKER INC., New York, NY (US)

(72) Inventors: David Goldberg, New York, NY (US); Michael Rakowski, Brooklyn, NY (US); Benjamin Cohen, New York, NY (US); Ben Hall, Brooklyn, NY (US); Brian Bernberg, Montclair, NJ (US); Hannah Zachritz, Brooklyn, NY (US)

(73) Assignee: WARBY PARKER INC., New York, NY (US)

( * ) Notice: Subject to any disclaimer, the term of this patent is extended or adjusted under 35 U.S.C. 154(b) by 0 days.

(21) Appl. No.: 17/549,563

(22) Filed: Dec. 13, 2021

(65) Prior Publication Data

US 2022/0101621 A1 Mar. 31, 2022

Related U.S. Application Data

(63) Continuation of application No. 17/085,485, filed on Oct. 30, 2020, now Pat. No. 11,200,753, which is a
(Continued)

(51) Int. Cl.
*G06T 19/20* (2011.01)
*G06T 7/62* (2017.01)
(Continued)

(52) U.S. Cl.
CPC .............. *G06T 19/20* (2013.01); *G06T 7/62* (2017.01); *G06T 7/75* (2017.01); *H04N 23/56* (2023.01);
(Continued)

(58) Field of Classification Search
None
See application file for complete search history.

(56) References Cited

U.S. PATENT DOCUMENTS 7,016,824 B2   3/2006   Waupotitsch et al.
9,357,204 B2   5/2016   Dehais et al.
(Continued)

FOREIGN PATENT DOCUMENTS

JP   2002-108196     4/2002
JP   2010-171646 A   8/2010
(Continued)

OTHER PUBLICATIONS

Jang, Wonkwi, et al. "Structured-light stereo: Comparative analysis and integration of structured-light and active stereo for measuring dynamic shape." Optics and Lasers in Engineering 51.11 (2013): 1255-1264. (Year: 2013).*
(Continued)

*Primary Examiner* — Ryan M Gray
(74) *Attorney, Agent, or Firm* — Duane Morris LLP

(57) ABSTRACT

Various aspects of the subject technology relate to systems, methods, and machine-readable media for virtual try-on of items such as spectacles. A virtual try-on interface may be implemented at a server or at a user device, and may use collision detection between three-dimensional models of the spectacles and of a user's face and head to determine the correct size and position of the spectacles for virtual try-on. With the determined size and position, a virtual representation of the spectacles is superimposed on an image of the user.

24 Claims, 13 Drawing Sheets

Related U.S. Application Data continuation of application No. 16/239,745, filed on Jan. 4, 2019, now Pat. No. 10,825,260.

(51) Int. Cl.
  *G06T 7/73* (2017.01)
  *H04N 23/56* (2023.01)

(52) U.S. Cl.
  CPC .............. *G06T 2207/30201* (2013.01); *G06T 2219/2004* (2013.01); *G06T 2219/2016* (2013.01)

(56) References Cited

U.S. PATENT DOCUMENTS

| | | | |
|---|---|---|---|
| 9,892,561 B2 | 2/2018 | Choukroun et al. | |
| 9,990,780 B2* | 6/2018 | Kornilov | G06V 20/20 |
| 10,825,260 B2* | 11/2020 | Goldberg | G06T 7/75 |
| 11,200,753 B2* | 12/2021 | Goldberg | G06T 19/20 |
| 11,488,239 B2* | 11/2022 | Goldberg | G06T 17/10 |
| 2011/0071804 A1 | 3/2011 | Xie | |
| 2013/0088490 A1* | 4/2013 | Rasmussen | G06T 17/00 345/421 |
| 2013/0335416 A1* | 12/2013 | Coon | G06T 19/20 345/423 |
| 2015/0055085 A1* | 2/2015 | Fonte | G02C 7/027 700/98 |
| 2015/0324951 A1 | 11/2015 | Coon et al. | |
| 2016/0178936 A1* | 6/2016 | Yang | G06T 19/20 351/246 |
| 2016/0246078 A1* | 8/2016 | Choukroun | G06V 40/20 |
| 2016/0269645 A1 | 9/2016 | Khoe et al. | |
| 2018/0096537 A1* | 4/2018 | Kornilov | G06V 20/20 |
| 2018/0336737 A1 | 11/2018 | Varady et al. | |
| 2019/0010608 A1 | 1/2019 | Higashi et al. | |
| 2019/0164341 A1* | 5/2019 | Venkataraman | G06V 40/164 |
| 2019/0225186 A1 | 7/2019 | Szawarski et al. | |
| 2022/0207539 A1* | 6/2022 | Laundy | G06T 7/33 |

FOREIGN PATENT DOCUMENTS

| | | |
|---|---|---|
| MX | 394439 | 3/2022 |
| TW | 201241781 A | 10/2012 |
| TW | 201601066 A | 1/2016 |
| WO | WO 2018/220203 A2 | 12/2018 |
| WO | WO 2020/142295 A1 | 7/2020 |

OTHER PUBLICATIONS

Mar. 25, 2022 Notification of Publication of the Request to Record issued by the Hong Kong Intellectual Property Department for Hong Kong Application No. 62021043991.0.
Sep. 16, 2021 Notice of Preliminary Rejection (Office Action) issued by the Korean Intellectual Property Office for Korean Patent Application No. 2021-7006780. [English translation included.].
Jun. 16, 2021 International Preliminary Report on Patentability and Written Opion issued by the International Bureau of WIPO for PCT International Patent Application No. PCT/US2019/068200.
Jul. 9, 2021 Office Action issued by the Taiwan Intellectual Property Office for Taiwanese Patent Application No. 109100106. [English translation included.].
Aug. 23, 2022 First Examination Report issued by the Indian Patent Office for Indian Patent Application No. 202117012527. [With English translation.].
Sep. 30, 2022 Examination Report No. 1 for Standard Patent Application issued by the Australian Patent Office for Australian Patent Application No. 202121579.
U.S. Appl. No. 10/825,260 B2, filed Nov. 3, 2020, Goldberg et al.
"Collision detection in physical simulation," Wikipedia, https://en.wikipedia.org/wiki/Colision_detection (retrieved Apr. 8, 2019), 6 pages.
"Binary search algorithm," Wikipedia, https://en.wikipedia.org/wiki/Binary_search_algorithm (retrieved Apr. 8, 2019), 10 pages.
Cardinal, D., "How Apple's iPhone X TrueDepth Camera Works," Extreme Tech http://www.extremetech.com/mobile/255771-apple-iphone-x-truedepth-camera (2017), 5 pages.
"3D Facial Norms Technical Notes", FaceBase, https://www.facebase.org/facial_norms/notes (retrieved Apr. 8, 2019), 29 pages.
Sep. 6, 2021 Notice of Reasons for Rejection issued by the Japanese Patent Office for Japanese Patent Application No. 2021-512526. [English translation included.].
Dec. 28, 2021 Notice of Reasons for Rejection issued by the Japanese Patent Office for Japanese Patent Application No. 2021-512526. [English translation included.].
Feb. 18, 2022 Notification of Publication of the Request to Record issued by the Hong Kong Intellectual Property Department for Hong Kong Application No. 62022045665.6.
Jan. 30, 2022 First Office Action issued by the China National Intellectual Property Administration for Chinese Patent Application No. 201980062191.5. [English translation included.].
Mar. 19, 2021 Communication Pursuant To Rules 161(1) and 162 EPC issued by the European Patent Office for European Patent Application No. 19845649.3.
Mar. 23, 2021 Examination Report No. 1 for Standard Patent Application (Office Action) issued by the Australian Patent Office for Australian Patent Application No. 2019419376.
Office Action for European Patent Application No. 19845649.3 dated May 2, 2023, 6 pages.

* cited by examiner

VIRTUAL TRY-ON SYSTEMS AND METHODS FOR SPECTACLES

BACKGROUND

CROSS-REFERENCE TO RELATED APPLICATIONS & FIELD

This application is a Continuation of U.S. Ser. No. 17/085,485, filed Oct. 30, 2020, which is a Continuation of and claims priority in and to U.S. Ser. No. 16/239,745, filed Jan. 4, 2019, which is now U.S. Pat. No. 10,825,260, issued on Nov. 3, 2020, each of which is hereby incorporated by reference herein in its entirety. The present disclosure generally relates to augmented reality, and more particularly to virtual try-on systems and methods for spectacles.

Description of the Related Art

Augmented reality applications have been developed in which virtual objects are digitally overlaid on images of real-world objects. In some cases, virtual objects such as gaming characters are added to images of a scene displayed by a smartphone or tablet as a user navigates the scene. In other cases, cartoon features such as cartoon animal facial features are added to an image of a face of a user of a smartphone or tablet, the image having been captured by the camera of the smartphone or tablet. In these conventional augmented reality systems, the cartoonish, or unrealistic, nature of the virtual objects allows significant leeway in the accuracy of the size, shape, orientation, and placement of the virtual objects relative to the real-world objects.

SUMMARY

The present disclosure provides a system for Virtual Try-On (VTO) of a pair of spectacle frames. The disclosed systems and methods allow a user of a VTO interface to determine, without having access to the physical spectacle frames, how the spectacle frames will look on their face. In the disclosed systems and methods, an image of the user is captured by a camera, a virtual representation of the spectacles frames are superimposed on the captured image, and the composite image is presented back to the user.

However, there are two major challenges when creating a realistic virtual try-on experience including (i) realistic sizing of the spectacles frames for unique face measurements and characteristics of a particular user, and (ii) realistic positioning of the spectacles frames as they would rest on the real three-dimensional face of the user.

In accordance with aspects of the disclosure, systems and methods are provided that overcome both of these challenges. For example, challenge (i) noted above can be overcome, at least in part, by determining the absolute size and distance of the user in the captured image, and challenge (ii) above can be overcome by iteratively intersecting a three-dimensional model of the spectacles frames with three-dimensional location information for various aspects of the user's face and head, as described in further detail hereinafter.

According to some aspects of the present disclosure, a computer-implemented method is provided. The method includes capturing, with a camera of an electronic device, an image of a face of a user; obtaining, using a sensor of the electronic device, three-dimensional location information for the user; obtaining a three-dimensional model of a pair of spectacles; determining a position of the virtual representation of the spectacles based on the image and the three-dimensional location information; determining a size of a virtual representation of the spectacles based on the image and the three-dimensional location information; and displaying, with a display of the electronic device, a combined image including the image of the user and the virtual representation of the spectacles with the determined size and the determined position.

According to some aspects of the present disclosure, a computer-implemented method is provided. The method includes capturing an image of a face of a user; obtaining a three-dimensional model of the user at a time of capture of the image; obtaining a three-dimensional model of a pair of spectacles; determining a size and a position for a virtual representation of the spectacles based on the image, the three-dimensional model of the user at the time of capture of the image, and the three-dimensional model of the pair of spectacles; and displaying the virtual representation of the spectacles, with the determined size and at the determined position, overlaid on the image of the face of the user.

According to some aspects of the present disclosure, a system is provided that includes a server having a database storing three-dimensional models for a plurality of pairs of spectacles; and a user device of a user. The user device includes memory storing code that, when executed by a processor of the user device, causes the processor to: capture an image of a face of the user; obtain a three-dimensional model of the user; obtain, from the server, the three-dimensional model of a selected one of the pairs of spectacles; determine a size and a position for a virtual representation of the selected one of the pairs of spectacles based on the image, the three-dimensional model of the user, and the three-dimensional model of the selected one of the selected one of the pairs of spectacles; and provide, for display, the virtual representation of the selected one of the pairs of spectacles, with the determined size and at the determined position, overlaid on the image of the face of the user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
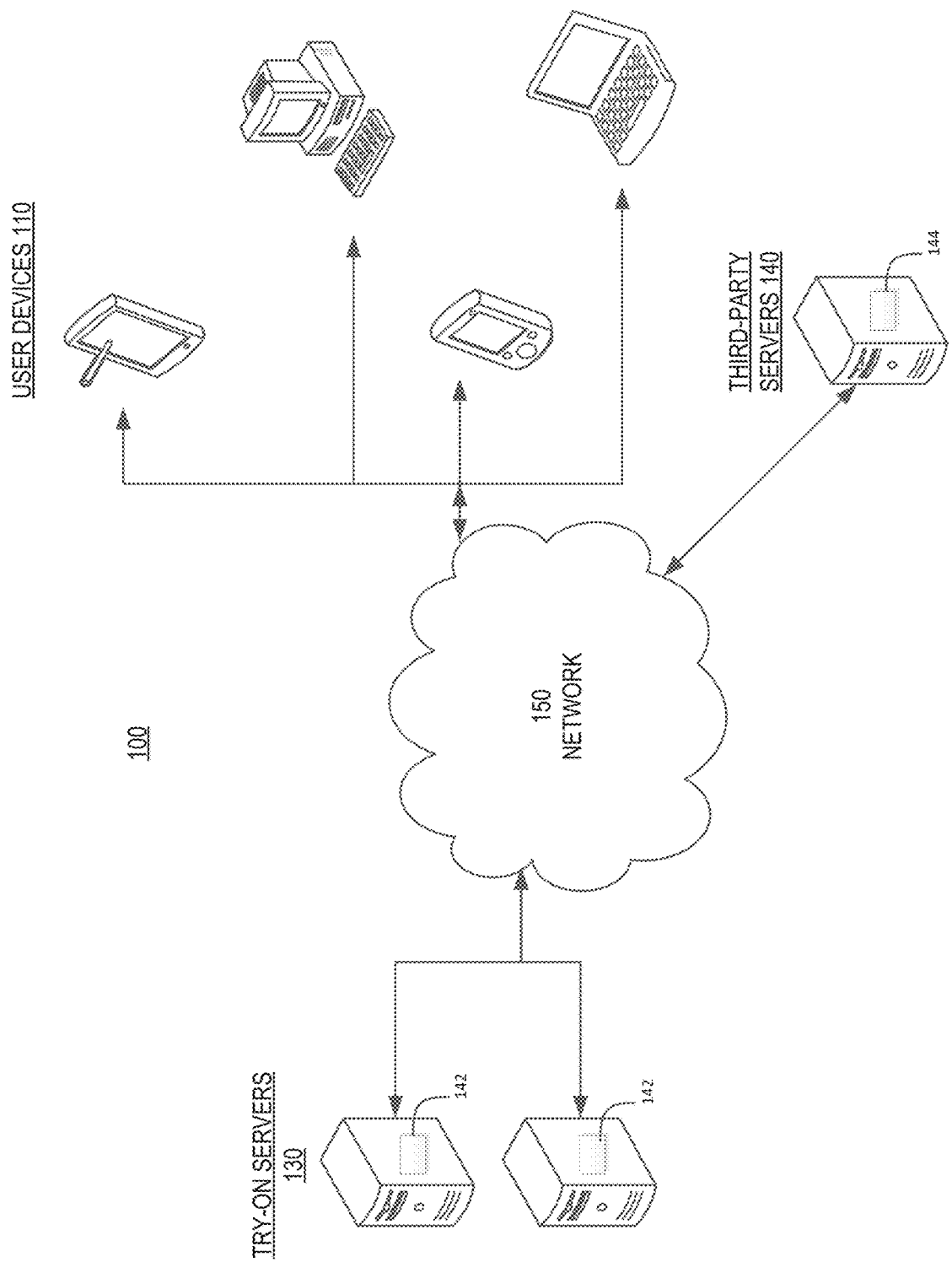
FIG. 1 illustrates an example architecture for virtual try-on, suitable for practicing some implementations of the disclosure.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Virtual try-on systems and methods are disclosed herein. Virtual try-on systems and methods can be particularly useful for viewing of how spectacles or spectacles frames would appear on the face of the user in the real world, without the user having access to the real-world spectacles or frames. However, it should also be appreciated that the systems and methods described herein can be applied for virtual try-on of other objects on other portions of the user's body, such as for virtual try-on of spectacles accessories, headwear, earrings, other body-piercing accessories, jewelry, clothing, or the like. The virtual try-on systems and methods disclosed herein allow the user to visualize the way a particular real-world item would appear on the particular body of the user.

However, it has been discovered that it can be challenging to provide VTO implementations that do not suffer from a lack of realism. In some scenarios, a VTO system may not have access to three-dimensional information about the user and may thus guess at how large to make a pair virtual glasses relative to the facial features of a user in an image. This is because it is not straightforward to estimate the physical size of a user's facial features from an image, particularly when there is no scale reference in or for the image. Some VTO systems may assume that the user's head is an average size in order to determine the appropriate size of the virtual spectacles. However, an assumption of this type would generate unrealistic results for users who have heads that are smaller or larger than average.

Furthermore, without three-dimensional information that cannot be obtained from a two-dimensional image, a VTO system may guess where the spectacles sit on the customer's face based on typical facial features of typical users. In reality, however, the particularities of how a particular pair spectacles sit on a particular user's face is a function of the precise shape of the spectacles' face front and the three-dimensional shape of the customer's nose and bridge. Accordingly, the use of typical features will give rise to unrealistic results in customers with features that differ from the assumed typical features.

In some scenarios, a VTO system may request that the user provide additional information such as inputting, to the VTO system, facial measurements or identifiers of particular facial features in a captured image. However, these additional user inputs can be inaccurate and undesirably time consuming, which may drive users of the VTO system away from the application or website providing the VTO interface (e.g., to a VTO system provided by a competitor).

In accordance with aspects of the subject disclosure, VTO systems and methods are provided that provide a realistic representation of the actual appearance of real-world spectacles on particular user's face, using a captured image of a user's face along with a three-dimensional representation of the user's face, complete with information about the size of the user's face in the image. Because the size of the user's face in the captured image is directly measured, the VTO systems and methods described herein can render a virtual representation of the spectacles in the correct relative size to the user's face. Accurate placement (e.g., positioning and/or orientation) of the virtual representation of the spectacles relative to the image of the user's face, as they would rest on the actual user's face, is described in further detail hereinafter.

Although many examples provided herein describe a user's device or physical features as being identified and/or stored, each user may grant explicit permission for such user information to be collected, shared and/or stored. The explicit permission may be granted using privacy controls integrated into the disclosed system. Each user may be provided notice that such user information will be stored with explicit consent, and each user may at any time end having the information stored, and may delete any stored user information. The stored user information may be encrypted to protect user security. Although some embodiments described herein may benefit from temporary storage of a user's biometric data on a remote server in accordance with any and all applicable state and/or federal regulations, in general a user's biometric data is stored and processed only on the user's device, and is discarded once a current VTO session concludes.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely on a server). In many examples, the user information does not include and/or share the specific identification of the user (e.g., the user's name) unless otherwise specifically provided or directed by the user.

Example System Architecture

FIG. 1 illustrates an example architecture 100 for virtual try-on of spectacles, suitable for practicing some implementations of the disclosure. The architecture 100 includes try-on servers 130 and user devices 110 connected over a network 150. As shown, third-party servers 140 may also be communicatively coupled to try-on servers 130 and/or user devices 110 via network 150. Try-on servers 130 may include databases 142 of information associated with objects that can be virtually tried-on with one or more of user devices 110. For example, databases 142 of try-on servers 130 may include three-dimensional models of various pairs of spectacles frames, with or without lenses, that are available for purchase (e.g., from the try-on server itself, from a physical brick-and-mortar store, or from another server such as third-party server 140). In some implementations, try-on servers 130 may also store code that, when executed by a processor of the server, causes the processor to provide a try-on interface (e.g., a try-on web interface) that performs the try-on methods and operations described herein. In some implementations, the code for the try-on interface may also, or alternatively, be stored at one or more of user devices 110. In these implementations, a user device running a try-on interface (e.g., generated by a try-on application running on the user device) may obtain the three-dimensional models of the spectacles from try-on servers 130 and perform try-on operations as described herein at the user device.

Third-party servers 140 may include servers that handle sales of the spectacles for which the three-dimensional representations are stored at try-on servers 130, or third-party servers 140 may store three-dimensional representations of other objects that can be tried on using the try-on interface provided by try-on servers 130 and/or user devices 110 (e.g., by storing three-dimensional models of the other objects in a database 144) and providing the three dimensional models to try-on servers 130 and/or user devices 110.

Try-on servers 130 can each be implemented with any device having an appropriate processor, memory, and communications capability for hosting a try-on interface and/or for storing three-dimensional models of spectacles or other objects. User devices 110 can be, for example, desktop computers, mobile computers such as laptop computers, tablet computers (e.g., including e-book readers), mobile electronic devices (e.g., a smartphone, tablet, or PDA), or any other devices having appropriate imaging (e.g., visible-light imaging and/or infrared imaging), illumination (e.g., visible light illumination and/or infrared light illumination), processor, memory, and communications capabilities for providing a virtual try-on interface. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

Example Virtual Try-On (VTO) Interface

Figure 2:
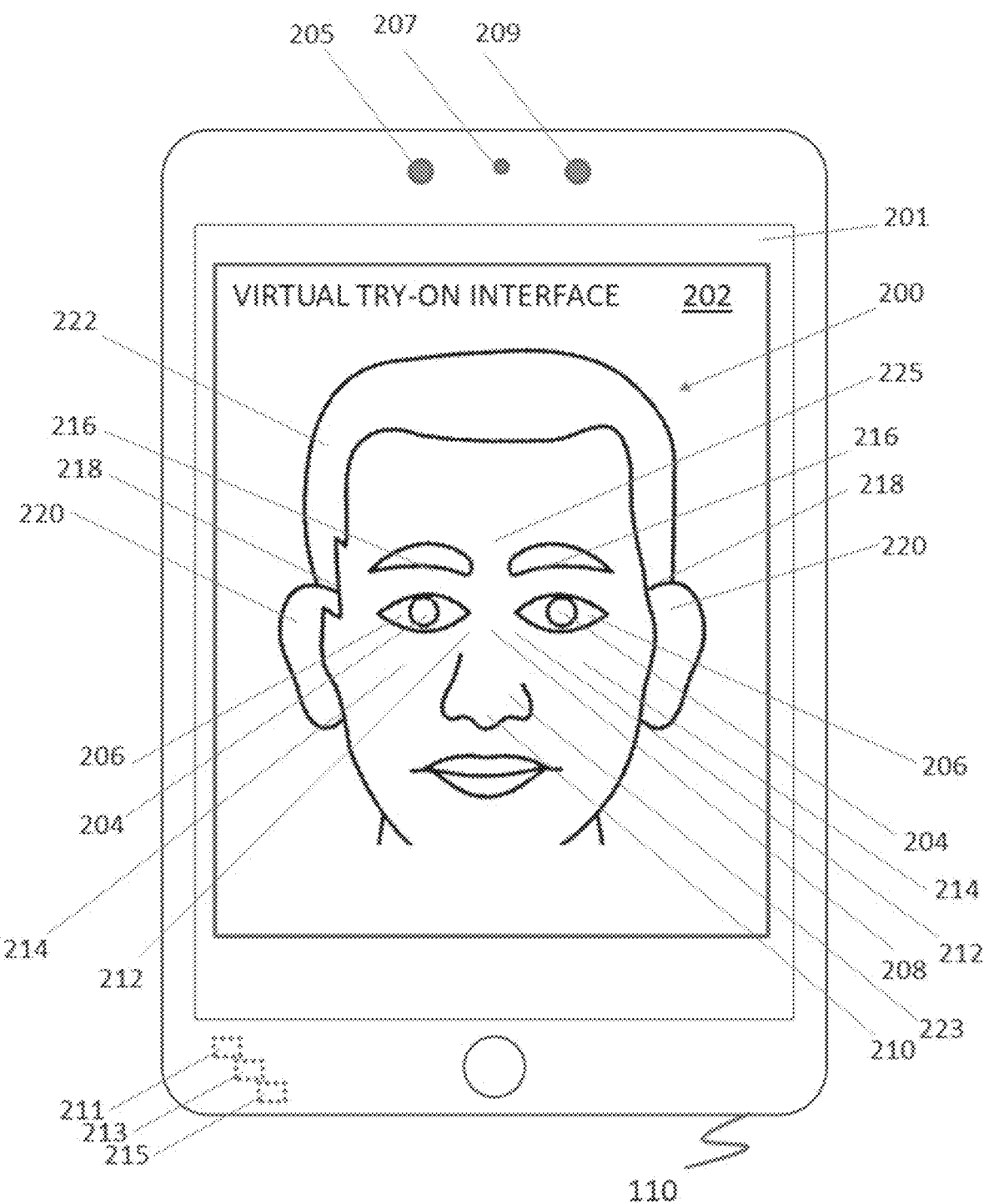
FIG. 2 is a schematic diagram illustrating a virtual try-on interface, according to certain aspects of the disclosure.

FIG. 2 is a schematic diagram illustrating a virtual try-on (VTO) interface 202 running on one of user devices 110. Virtual try-on interface 202 may be a web interface based on code being executed at a remote device such as one of try-on servers 130, or may be a local virtual try-on application running on the user device itself.

In the example of FIG. 2, an image 200 of a user has been captured (e.g., using a visible light camera 205 of the user device 110) and is displayed with a display 201 of the user device 110. It can be seen that various features of the user's face can be identified in image 200. For example, the user's eyes 206, nose 223, and hair 222 can be seen and identified in image 200 by user device 110 and/or try-on servers 130. More detailed features such as the user's sellion 208, pupil centers 204, otobasion superius 218, orbitale superius 216, glabella 225, and/or pronasale 210 can also be seen and identified by user device 110 and/or try-on servers 130. Other facial landmarks than can also, or alternatively, be seen and identified in image 200 by user device 110 and/or try-on servers 130 include the user's endocanthion, exocanthion, tragion, zygion, palpebrale superius, palpebrale inferius, frontotemporale, maxillofrontalle, orbitale, tragion, nasion, and menton (as examples).

However, image 200 may be a two-dimensional image that does not include any information regarding the size and/or absolute location of any of the features of the user in the image. Three-dimensional location information for these and/or other features of the user can be obtained using an additional sensor 209 such as another camera, a motion sensor (e.g., for visual inertial odometry), a proximity sensor, a time-of-flight sensor, a laser range finder, or any other sensor capable of capturing three-dimensional location information for an object in the field of view of camera 205. In one example, sensor 209 may be implemented as another visible light camera that is spatially offset from camera 205 so that parallax information (e.g., a parallax effect between images captured by two stereo imaging cameras 205 and 209) and the known distance between the cameras can provide the three-dimensional location information. In another example, three-dimensional location information can be generated using structure-from-motion operations based on motion of the user relative to camera 205 and/or sensor 209 implemented as a camera.

In another example, sensor 209 may be an infrared camera that captures infrared light from the user's face and/or head such as reflections of one or more infrared beams emitted by an infrared light source 207. For example, infrared light source 207 may emit several (e.g., tens, hundreds, or thousands) of infrared beams that generate infrared spots at various measurement locations on the user's face and/or head, reflected portions of which can be imaged by sensor 209. Distortions of the infrared spots in the captured infrared image can be used, along with the known sizes and shapes of the infrared beams, to determine the absolute distance to each of the infrared spots. Accordingly, sensor 209, whether implemented as a camera or other three-dimensional sensor, allows the absolute size of the user's face and/or various features of the user's face in image 200 to be determined (e.g., by determining the distances between the absolute three-dimensional locations of various measurement locations with corresponding features in image 200).

User device 110 (and/or try-on servers 130) may generate and/or store three-dimensional location information for the user such as measurement point absolute three-dimensional locations 211, a three-dimensional model 213 of the user based on the measurement point absolute three-dimensional locations 211, and/or facial landmark absolute locations 215. The three-dimensional location information that is stored is mapped to the two-dimensional locations of corresponding features in image 200. Facial landmark absolute locations 215 can be a subset of measurement point absolute three-dimensional locations 211, may be averaged, interpolated, and/or otherwise combined measurement point absolute three-dimensional locations 211, or can be determined based on three-dimensional model 213. Three-dimensional model 213 may be generated based on measurement point absolute three-dimensional locations 211 or based on facial landmark absolute locations 215 that have been extracted or generated from measurement point absolute three-dimensional locations 211. In various implementations, three-dimensional model 213 and/or facial landmark absolute locations 215 may be generated at user device 110 or at try-on servers 130 using data (e.g., measurement point absolute three-dimensional locations 211) provided by user device 110 to the server.

Figure 3:
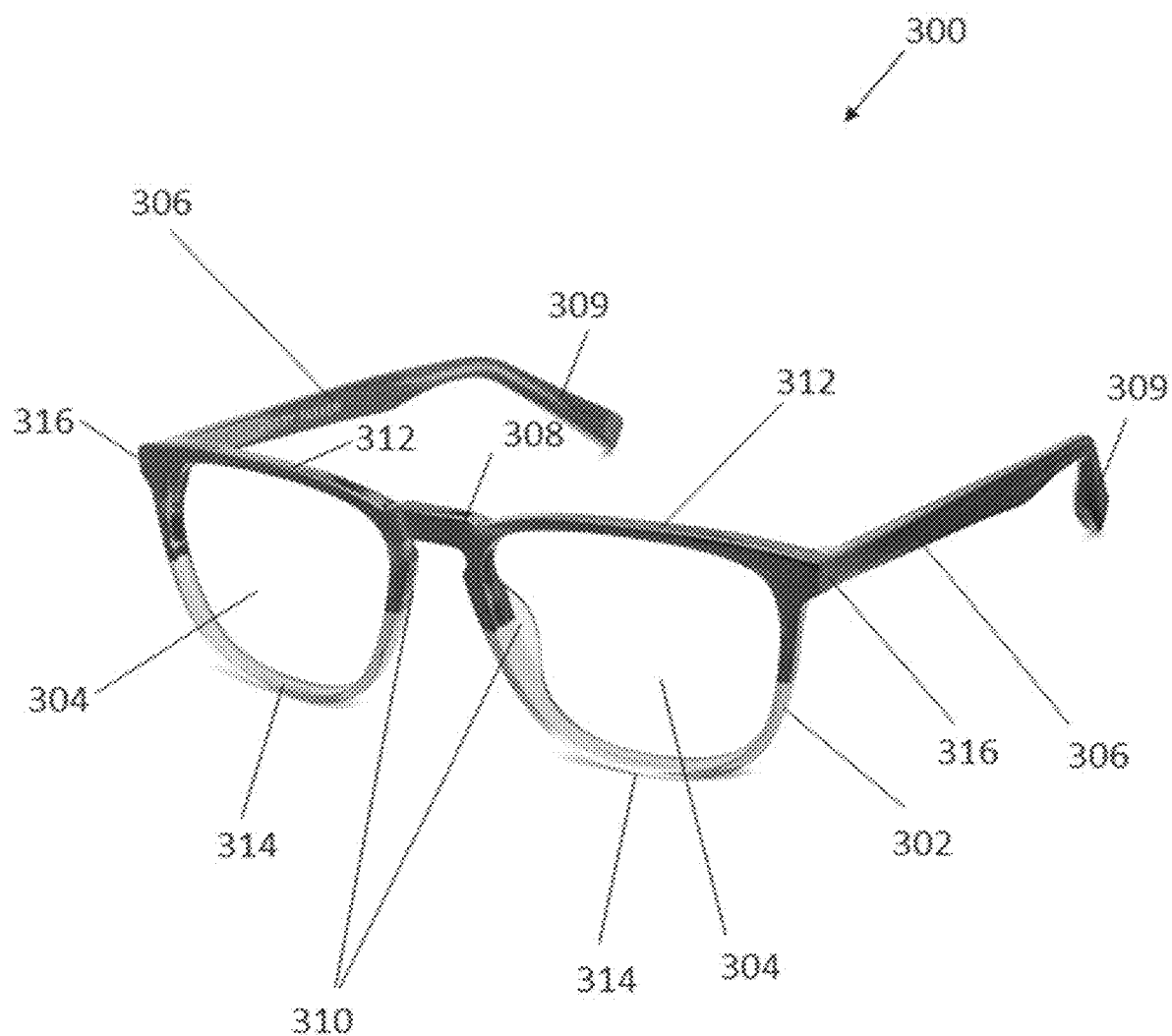
FIG. 3 illustrates an example pair of spectacles, according to certain aspects of the disclosure.

The user represented in image 200 may desire to try on an object to which the user does not have physical access, such as spectacles 300 of FIG. 3. As shown in FIG. 3, spectacles 300 include physical features such as frame 302 and lenses 304 mounted in the frame.

Frame 302 includes a bridge 308, nose pads 310, temples 306, end pieces 316, and temple tips (earpieces) 309. Nose pads 310 can be built to the frame (e.g., for acetate frames) or may be separate pads that are disposed on pad arms (e.g., adjustable arms) that extend from the frame (e.g., for metal or mixed-material frames). Various portions of frame 302 can be points of contact with corresponding portions of a wearer's face, depending on the particular characteristics of that wearer. For example, the bridge 308 commonly rests against the sellion 208 of a wearer for acetate frames with integrated nose pads 310, while the integrated nose pads rest on bridge portions 212 of the user's nose. In another example, for metal frames with nose pads on pad arms, the bridge 308 will float away from the user's skin, or will rest against a relatively higher location on the user (e.g., the glabella 225), with the spectacles primarily supported by contact between nose pads 310 and bridge portions 212 of the user's nose.

With any frame material, bottom ends 314 of the frame (e.g., below the lens 304), or the bottom of the lenses 304 in spectacles with rimless or partially rimless frames, may float away from contact with the user, or may rest against the cheekbone portions 214 of the user's skin. Similarly, with any frame material, portions 312 of the frame above the lens (or top portions of lenses mounted in rimless frames), may float away from contact with the user, or may rest against the eyebrows, the orbitale superius 216, or nearby portions of the user's skin. Similarly, with any frame material, temples 306 of frame 302 will rest against the otobasion superius 218 and/or portions of temple tips 309 may rest against portions of the user's head behind the user's ears 220. The points of contact between spectacles 300 and the user's face and head may be symmetric on left and right sides of the user's face and head for users with highly symmetric features, or may be different for users with one or more asymmetric features.

The features of spectacles 300 noted in FIG. 3, and/or other features of spectacles 300, are described by a three-dimensional model of spectacles 300 that is stored by try-on servers 130 (e.g., for each pair of spectacles that is available for order or purchase).

Three-dimensional models of the user's face and/or head as described herein may include reference points and parameterized mathematical functions with parameters that cause the mathematical functions to connect the reference points along paths that correspond to the contours of the user's face and/or head. Three-dimensional models of the spectacles as described herein may include reference points and parameterized mathematical functions with parameters that cause the mathematical functions to connect the reference points along paths that correspond to the contours of the spectacles. In some scenarios, an integrated three-dimensional model of the user's face and/or head, and the spectacles, can be generated.

Once image 200, the three-dimensional location information for the user in the image (e.g., 211, 213, and/or 215 of FIG. 2), and the three-dimensional model of a particular pair of spectacles 300 have been obtained, a virtual representation of spectacles 300 can be overlaid on image 200 so that the user can see how that particular pair spectacles 300 would appear in the real world when worn on that user's particular facial features.

Figure 4:
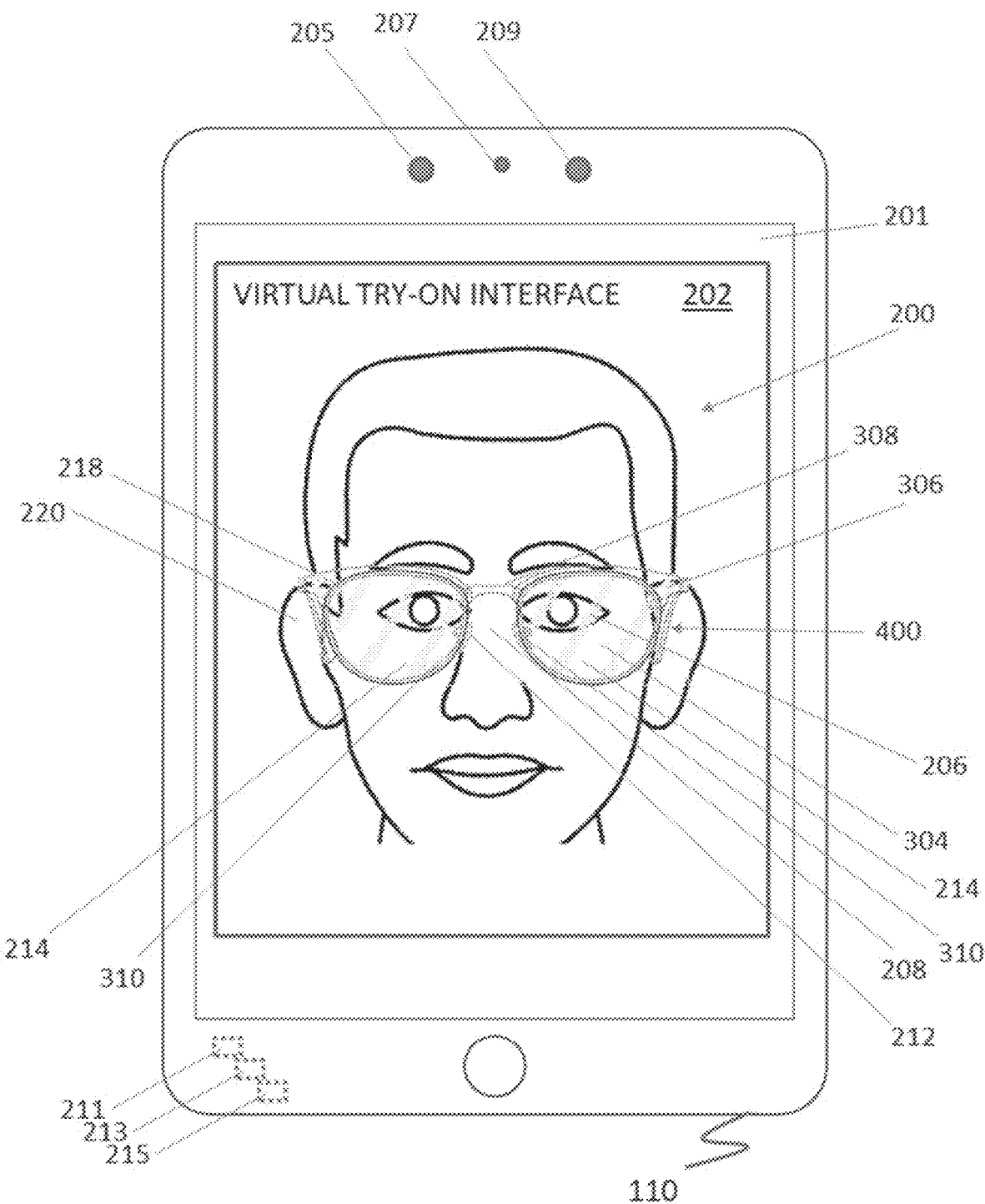
FIG. 4 is a schematic diagram illustrating a virtual try-on interface displaying a virtual representation of spectacles on an image of a user, according to certain aspects of the disclosure.

For example, FIG. 4 illustrates a virtual representation 400 of spectacles 300 has been sized such that the actual size of spectacles 300, relative to the actual size of the user's face, is accurately represented. It should be appreciated that the virtual representation 400 not been sized to match the apparent size of the user's features in the image, but instead to match the real-world size of the user's features. For this reason, the virtual representation 400 of spectacles 300 may appear oversized or undersized relative to the size of the users head and facial features (as opposed to the example of FIG. 4 in which the size appears to be approximately correct for the user), if the actual spectacles 300 would be oversized or undersized for the user in the real world. For example, if spectacles 300 are adult-sized spectacles and the user is a child, virtual representation 400 of spectacles 300 will appear oversized on image 200.

In some implementations, VTO interface 202 can detect a mis-sized pair of spectacles based on the known size of the spectacles and the three-dimensional location information, to alert the user to a mis-size and/or to identify and/or provide a recommendation of one or more different pairs of spectacles to try on that may be more appropriately sized.

In the example of FIG. 4, the virtual representation 400 of spectacles 300 is displayed, overlaid on the image 200, in a configuration in which virtual representation 400 has been positioned and sized relative to the image of the user to appear as spectacles 300 would rest on the user's face in the real world. Displaying the virtual representation of the spectacles, (with the determined size and at the determined position, overlaid on the image of the face of the user, as in the example of FIG. 4) may include transforming the three-dimensional model of the spectacles into a coordinate system corresponding to the displayed two-dimensional image, determining (e.g., based on the color, size, and shape of the transformed spectacles) a brightness and a color for each pixel in a modified version of the two-dimensional image accordingly so that the virtual representation 400 appears correctly, and operating the display pixels of the display 201 of device 110 to display each of the pixels of the modified image with the determined brightness and color for that pixel.

In the example of FIG. 4, virtual representation 400 of spectacles 300 is overlaid on image 200 to show nose pads 310 resting on bridge portions 212 of the user's nose and supporting bridge 308 above and away from sellion 208. Temples 306 are shown resting at the otobasion superius 218 of the user's ear 220.

However, the point of contact, or combination of points of contact between a particular pair of spectacles 300 and a particular user's face will determine how that particular pair of spectacles will rest on that particular user's face. Accordingly, in order to determine the position and orientation of a virtual representation 400 of spectacles 300 on an image 200 of a particular user, the three-dimensional model of the spectacles may be placed in a virtual scene with the three-dimensional location information for the user (e.g., measurement point absolute three-dimensional locations 211, three-dimensional model 213, and/or facial landmark absolute locations 215), and a test is performed to determine whether the two entities intersect. In an intersection test, user device 110 and/or servers 130 determine whether a geometrical surface corresponding to the surface of the user's face (based on the measurement point absolute three-dimensional locations 211, three-dimensional model 213, and/or facial landmark absolute locations 215) coincides with a geometrical surface corresponding to the outer surface of the spectacles (based on the three-dimensional model of the spectacles) at any point. If the two geometrical surfaces coincide, the point of contact, or a set of points of contact (e.g., corresponding to one or more intersection curves between the two geometrical surfaces) may be identified. Multiple intersection tests can be performed in an iterative manner with different positions and/or orientations of the three-dimensional model of spectacles 300 relative to the three-dimensional location information for the user, to identify the correct set of points of contact, and to determine the correct position and orientation of a virtual representation 400 of spectacles 300 on an image 200 of a particular user.

These iterative intersection tests may be referred to as physical placement operations, and may be performed to simulate the physical process that occurs when a customer actually places spectacles on their face.

Figure 5:
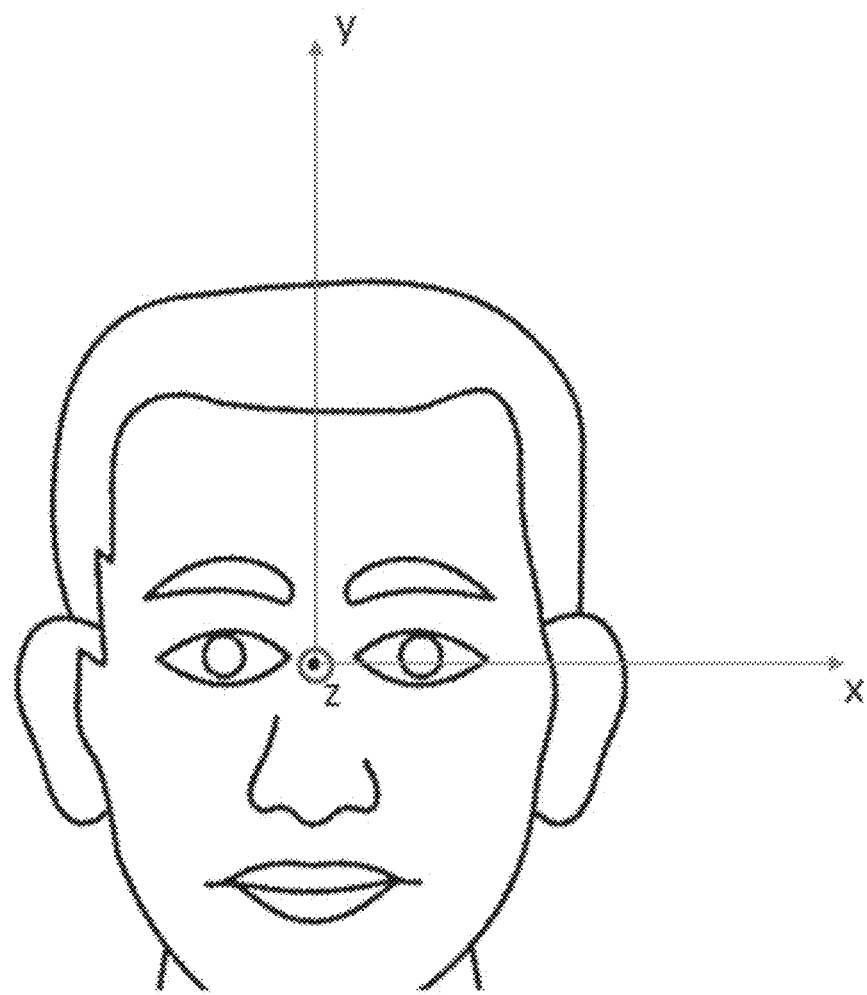
FIG. 5 is a schematic diagram illustrating a facial coordinate system, according to certain aspects of the disclosure.

The physical placement operations may include designating a facial coordinate system, such as the facial coordinate system shown in FIG. 5. In the example of FIG. 5, the x axis refers to the axis that defines (e.g., extends between) a user's left and right sides, where the positive x axis extends from the origin toward user's own left side. They axis in FIG. 5 refers to the axis that defines (e.g., extends between) the top and bottom of the user's head, where the positive y axis extends orthogonally to the x axis from the origin toward the top of the user's head. As shown, the z axis refers to the axis that defines (e.g., extends between) the front and back of the user's head, where the positive z axis extends orthogonally to the x axis and the y axis and from the origin towards the front of the user's head.

The physical placement operations may include identifying a facial landmark that serves as the origin of the facial coordinate system. In this way, the placement of the spectacles can be described as an offset from the origin of the facial coordinate system. One particularly useful reference point is the sellion 208, which refers to the deepest midline point of the angle formed between the nose and forehead, or the deepest point in the "divot" between the user's eyes. The location of sellion 208 may be identified by user device 110 and/or try-on servers 130 using image 200 and/or the three-dimensional location information for the user. The physical placement operations may include identifying an origin of a spectacle coordinate system, such as the bottommost, back-most point in the horizontal center of the spectacles' bridge 308.

Figure 6:
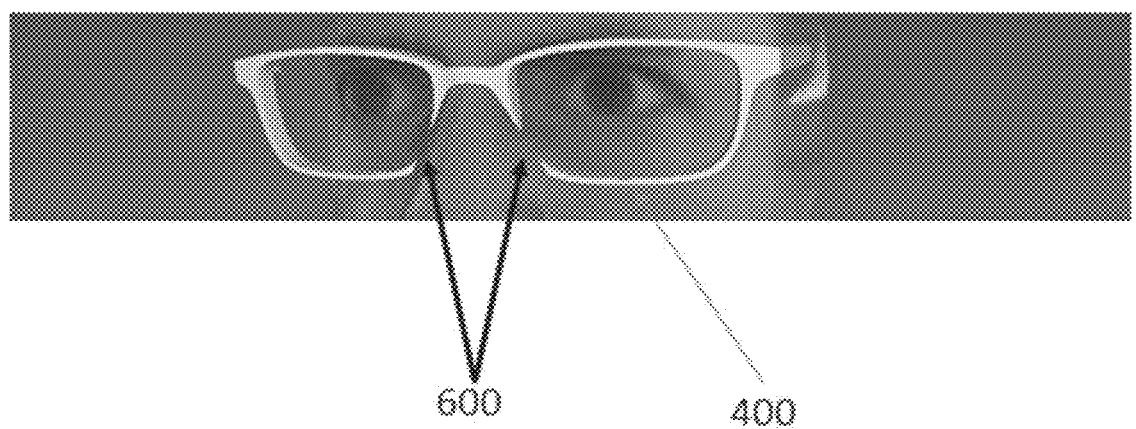
FIG. 6 is a schematic diagram illustrating an embedded contact between a three-dimensional model of spectacles and a three-dimensional model of a user, according to certain aspects of the disclosure.

The physical placement operations may be adjusted to provide varying levels of complexity and realism, depending on the computational resources (e.g., processing power, memory, and/or communications bandwidth) available at the device performing the virtual try-on operation. In one example, the physical placement operations may include (i) setting the x offset between the original of the spectacle coordinate system and the facial coordinate system to zero, and (ii) selecting fixed y and z offsets between the original of the spectacle coordinate system and the facial coordinate system (e.g., between the sellion and spectacle origin). In this example, the fixed y and z offsets may be selected based on the type of frame (e.g., acetate or metal) and/or the locations of a set of facial landmarks for the user. Fixed y and z offsets of this type may be used in low computing power or low bandwidth scenarios to give realistic results for many combinations of customers and spectacles, but with the likelihood that the results will not be realistic in all cases. For example, in some cases, fixed y and z offsets will result in unrealistic intersections between the spectacle model and the face model, causing the spectacles to appear inappropriately "behind" the face or embedded within the user's face as shown in FIG. 6. In the example of FIG. 6, portions 600 of the virtual representation 400 of spectacles 300 are inappropriately embedded within the user's face. In other cases, the spectacles may appear to be unrealistically floating in front of the user's face.

In order to provide a more realistic try-on experience, the physical placement operations may include one or more iterative intersection operations. Examples illustrating two sets of iterative intersection operations are shown in FIGS. 7A-7D and 8A-8D.

FIGS. 7A-7D illustrate an iterative intersection operation using a fixed z offset (e.g., a common z offset at multiple test positions) and a variable y offset, which may be used for placement of acetate frames that have rigid face fronts and are typically pushed up against the sellion when worn. In the example of FIGS. 7A-7D, multiple test positions of the three-dimensional model of the pair of spectacles in the facial coordinate system are illustrated, each having the x offset between the origin of the three-dimensional model of spectacles 300 and the origin of the facial coordinate system set to zero. A fixed z offset between the two origins (e.g., between the sellion and the spectacle origin) can be selected (e.g., based on a predetermined typical separation between the spectacles and the sellion). To determine the final y offset for the final position of the virtual representation 400 of spectacles 300, the y offset may be varied (e.g., as illustrated in FIGS. 7A-7D) to generate multiple test positions to find the value of the y offset that results in the spectacles just making contact with the face. In the example of FIGS. 7A-7D, each of four example test positions in the facial coordinate system has a different y offset along the y axis, a zero x offset along the x axis, and a common z offset along the z axis.

Figure 7A:
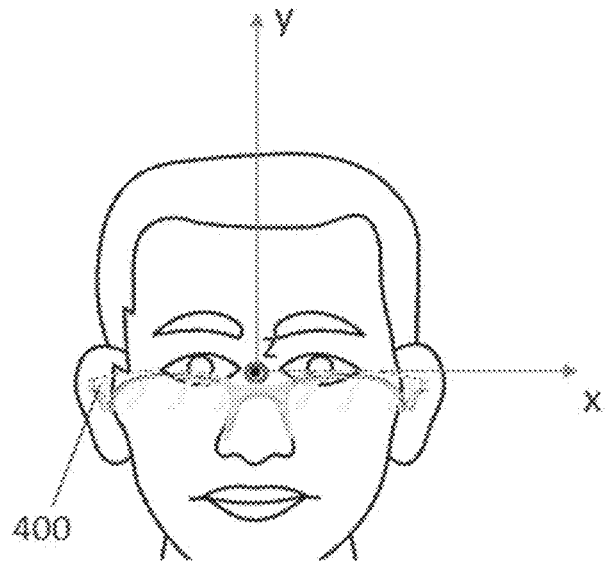
FIGS. 7A-7D illustrate various test positions for a three-dimensional model of spectacles in a facial coordinate system during exemplary physical placement operations for virtual try-on, according to certain aspects of the disclosure.

In the example of FIG. 7A, a first test position (e.g., a first y offset with a fixed z offset, and zero x offset) has been selected. However, in this first test position, the three-dimensional model of spectacles 300 is partially embedded in the three-dimensional representation of the user's face (e.g., the three-dimensional location information), which, if displayed, would cause virtual representation 400 of spectacles 300 to disappear into the image of the user's face, as shown. This embedding may be detected (e.g., by user device 110 or try-on servers 130) by performing an intersection operation that includes a collision detection operation between the three-dimensional model of spectacles 300 and the three-dimensional representation of the user's face.

Figure 7B:
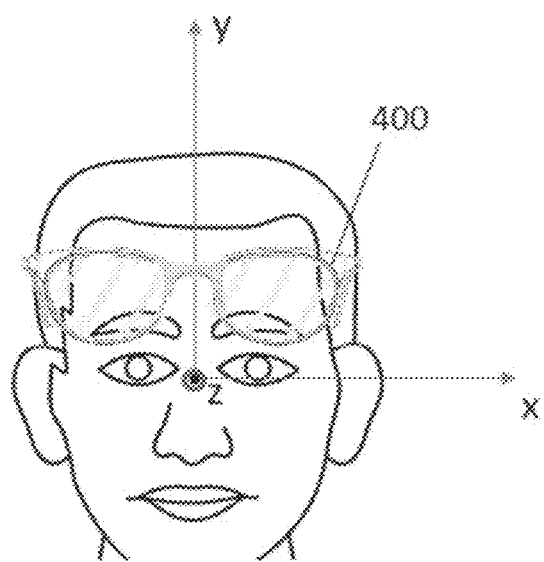
Figure 7C:
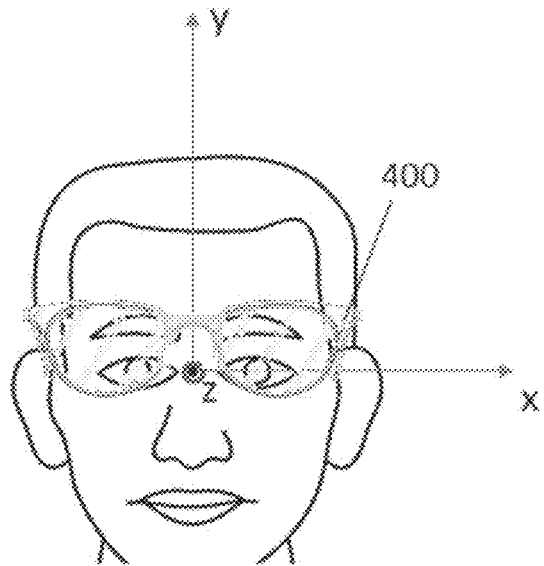

When an embedded contact of the type shown in FIG. 7A is detected, the three-dimensional model of spectacles 300 may be moved to a new test position (e.g., at a new y offset with the same common z offset and zero x offset) as illustrated in FIG. 7B. For example, the new test position may be an incrementally different new test position or a new test position at which there is no contact between the three-dimensional model of spectacles 300 and the three-dimensional representation of the user's face (e.g., as determined with another collision detection operation at the new position). The new test position may correspond to a parameter describing an initial translation increment.

If it is determined (e.g., by user device 110 or try-on servers 130) that there is no contact between the three-dimensional model of spectacles 300 and the three-dimensional representation of the user's face as in the example of FIG. 7B, another new test position (e.g., another new y offset) can be determined, for example, using a binary search operation or other search algorithm as would be understood by one skilled in the art, and another intersection (e.g., collision detection) operation is performed at that next new test position. For example, in the example of FIG. 7C, the new y offset is approximately halfway between the y offset of FIG. 7B and a zero y offset. However, at the test position shown in FIG. 7C, user device 110 or try-on servers 130 may determine that there is still no contact between the three-dimensional model of spectacles 300 and the three-dimensional representation of the user's face (e.g., as determined by performing another collision detection operation at the new position of FIG. 7C).

Figure 7D:
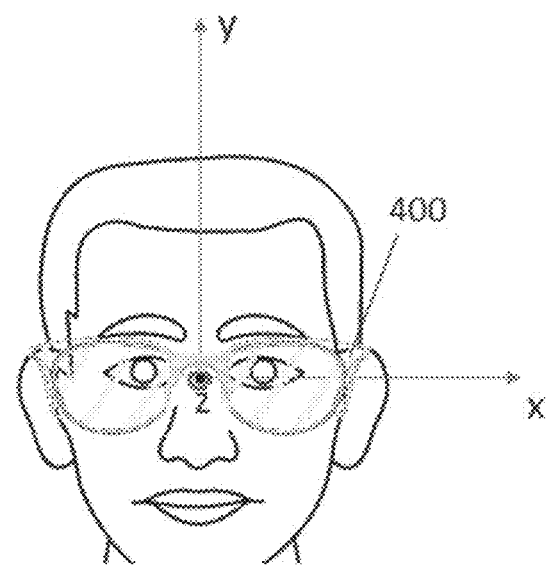

The physical placement operations include one or more additional collision detection (intersection) operations at one or more additional y offsets (e.g., each determined using a binary search algorithm) until the correct resting position for the three-dimensional model of spectacles 300 on the three-dimensional representation of the user's face is identified (e.g., as illustrated in FIG. 7D). The correct resting position may be the first position at which the three-dimensional model of spectacles 300 makes any contact with the three-dimensional representation of the user's face while moving from a position of no contact. However, in some scenarios, the physical placement operations may include additional operations such as determining whether that first contact is a resting contact at which the spectacles would be stable on the user's face or if the first contact is an unstable contact.

For example, if the first contact is contact between bridge 308 and the sellion 208 of the user or between nose pads 310 and bridge portions 212 of the user's nose, the contact may be determined to be a stable or resting contact. However, in some scenarios, the first contact may be between the user's face and bottom portions 314 of frames 302 before contact with bridge 308 or nose pads 310, which may indicate an unstable contact (e.g., because the spectacles would likely fall or slide to another position in which at least one of bridge 308 or nose pads 310 is in contact with the user, whether or not the contact with the bottom portions 314 is maintained during or after the fall or slide).

If additional intersections at additional positions are performed following first contact, the additional positions may be selected to avoid embedding and/or to avoid separation of the first contact point until at least one other contact point takes over control of the position of the spectacles relative to the user's face (e.g., by simulating sliding the bottom portions of the frames along the users face until the nose pad or bridge make contact).

FIGS. 8A-8D illustrate an iterative intersection operation using a fixed y offset (e.g., a common y offset for all test positions) and a variable z offset, which may be used for placement of metal and/or mixed-material frames that have adjustable nose pads that allow for more flexibility in placement (e.g., since the user can later adjust the nose pads in the real world to obtain the correct y offset, allowing that correct y offset to be assumed and held fixed during the placement operations). In the example of FIGS. 8A-8D, each of four test positions in the facial coordinate system has a different z offset along the z axis, a zero x offset along the x axis, and a common y offset along the y axis.

Figure 8A:
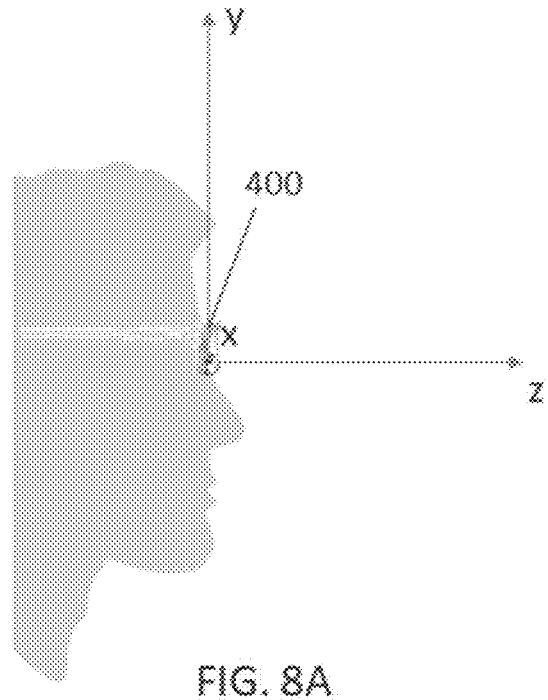
FIGS. 8A-8D illustrate various test positions for a three-dimensional model of spectacles in a facial coordinate system during other exemplary physical placement operations for virtual try-on, according to certain aspects of the disclosure.

In the example of FIG. 8A, a first test position (e.g., a first z offset with a fixed y and zero x offset) has been selected. However, in this first test position, the three-dimensional model of spectacles 300 is embedded in the three-dimensional representation of the user's face, which, if displayed, would cause at least portions of virtual representation 400 of spectacles 300 to disappear into the user's face, as shown. This embedding may be detected (e.g., by user device 110 or try-on servers 130) by performing an intersection operation that includes a collision detection operation between the three-dimensional model of spectacles 300 and the three-dimensional representation of the user's face.

Figure 8B:
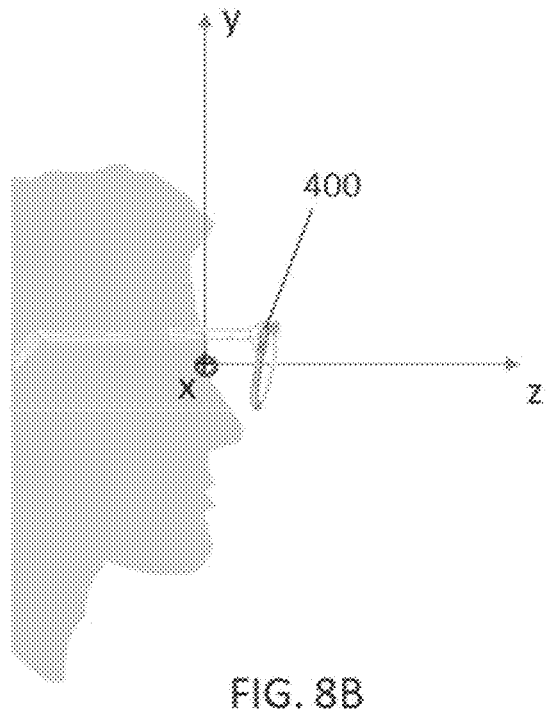
Figure 8C:
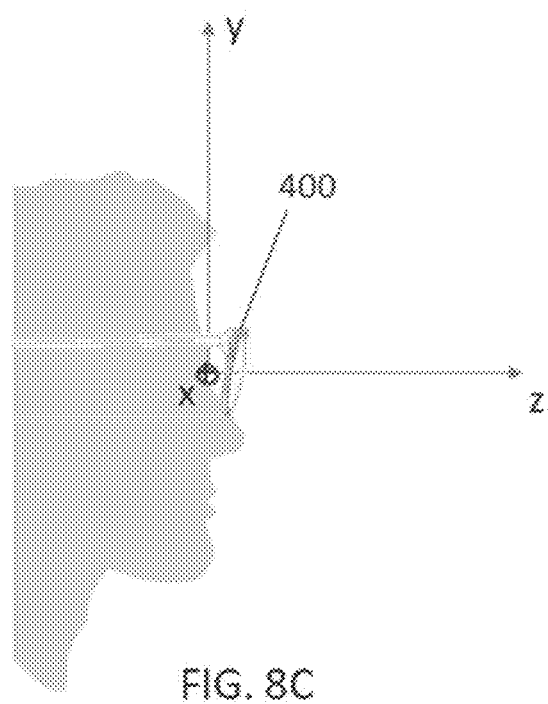

When an embedded contact of the type shown in FIG. 8A is detected, the three-dimensional model of spectacles 300 may be moved to a new test position (e.g., at a new z offset) as illustrated in FIG. 8B. For example, the new test position may be an incrementally different new test position or a new test position at which there is no contact between the three-dimensional model of spectacles 300 and the three-dimensional representation of the user's face (e.g., as determined with another collision detection operation at the new position).

If it is determined (e.g., by user device 110 or try-on servers 130) that there is no contact between the three-dimensional model of spectacles 300 and the three-dimensional representation of the user's face as in the example of FIG. 8B, another new test position (e.g., another new z offset) can be determined, for example, using a binary search algorithm or other search algorithm as would be understood by one skilled in the art, and another intersection (e.g., collision detection) operation is performed at that next new test position. For example, in the example of FIG. 8C, the new z offset is approximately halfway between the z offset of FIG. 8B and a zero z offset. However, at the test position shown in FIG. 8C, user device 110 or try-on servers 130 may determine that there is still no contact between the three-dimensional model of spectacles 300 and the three-dimensional representation of the user's face (e.g., as determined by performing another collision detection operation at the new test position of FIG. 8C).

Figure 8D:
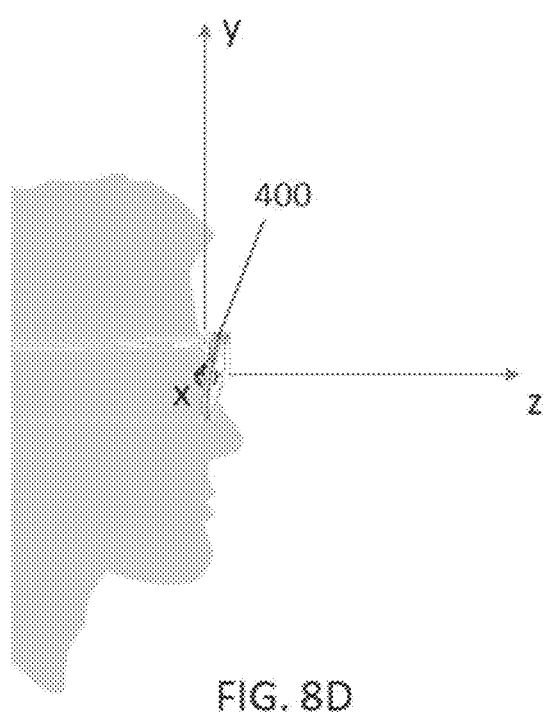

The physical placement operations include one or more additional collision detection (intersection) operations at one or more additional z offsets (e.g., each determined using a binary search algorithm) until the correct resting position for the three-dimensional model of spectacles 300 on the three-dimensional representation of the user's face is identified (e.g., as illustrated in FIG. 8D). The correct resting position may be the position at which the three-dimensional model of spectacles 300 makes any contact with the three-dimensional representation of the user's face while moving from a position of no contact. However, in some scenarios, the physical placement operations may include additional operations such as determining whether that first contact is a resting contact at which the spectacles would be stable on the user's face or if the first contact is an unstable contact as described herein.

In the examples of FIGS. 7D and 8D, because the spectacle model is positioned precisely in contact with the face model, there will be no unrealistic intersections between them when the virtual representation 400 is overlaid on image 200. It should be appreciated that, although the y and z variations of FIGS. 7A-7D and 8A-8D respectively are illustrated separately, in some scenarios, iterative intersection operations can be performed with variations of the test position of the three-dimensional model of the spectacles in the x, y, and/or z directions of the facial coordinate system.

In some try-on operations, high-fidelity position-improvement operations can be performed in which additional features of spectacles 300 (e.g., the mass, flexibility, materials, and/or other characteristics of the frames 302, and/or the mass, magnification power, and/or other properties of the lenses 304), and/or additional features of the user (e.g., the resilience of the user's skin, the tilt angle of the user's head, the relative projection distances of various facial features, etc.) are incorporated into the three-dimensional models and/or the intersection operations to determine the final position. For example, a resting contact position without any deformation of frames 302 or the user's skin can first be established (e.g., using the processes described above in connection with FIGS. 7A-7D and 8A-8D), followed by a high-fidelity position-enhancement operation in which the force and direction of gravity and the mass and flexibility the frames and/or the pliability of the user's skin is incorporated to determine an improved resting position.

Figure 9:
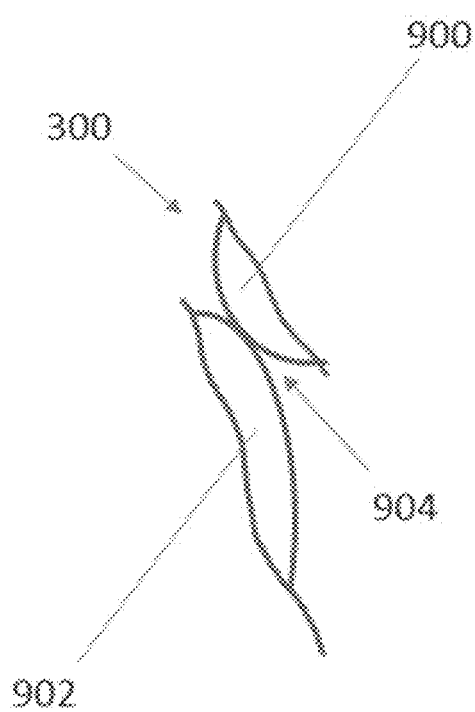
FIG. 9 illustrates a cross-sectional view of a portion of a pair of spectacles in contact with a portion of a user's face or head, according to certain aspects of the disclosure.

For example, FIG. 9 illustrates a cross-sectional view of a portion 900 of spectacles 300 that is in resting contact with a portion 902 of the user's skin at a contact location 904. Portion 900 may represent a portion of bridge 308 in contact with portion 902 representing a portion of the user's nose such that contact location 904 is at or near the sellion 208. In another example, portion 900 may represent a part of bottom portion 314 of frames 302 in contact with portion 902 representing cheekbone portion 214 of the user's face, where the frames are also resting against the user's face and/or head at one or more other locations. The resting contact arrangement illustrated in FIG. 9 may be used as the final position of the three-dimensional model of spectacles 300 for display of virtual representation 400 in some scenarios. However, in the high-fidelity position-enhancement operations, it may be determined that the force of gravity may press portion 900 into portion 902 of the user's skin in the real world.

Figure 10:
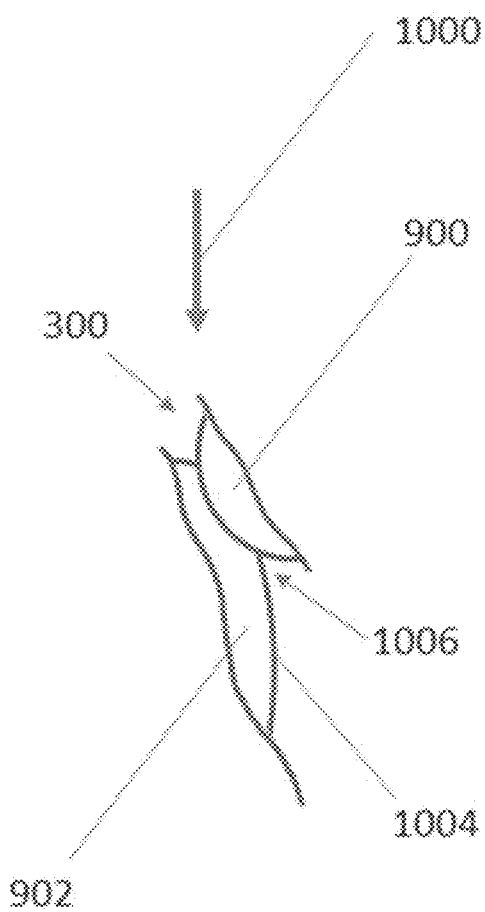
FIG. 10 illustrates a cross-sectional view of the portion of the pair of spectacles of FIG. 9 compressing the portion of a user's face or head, according to certain aspects of the disclosure.

For example, as illustrated in FIG. 10, user device 110 and/or try-on servers 130 may determine a direction 1000 of gravity, a mass of spectacles 300, the contour shape 1004 of portion 902 of the user's skin, and the pliability of the user's skin, to determine a compression 1006 of some or all of portion 902 that would occur due to the weight of the spectacles. Image 200 and/or the position of virtual representation 400 of spectacles 300 may be modified to indicate to the user that compression 1006 would occur for that particular pair of spectacles.

These high-fidelity operations can also be used to simulate motion of the spectacles relative to the user's face or head (e.g., due to a loose fit and a tipped head, due to back-and-forth or up-down motion of the user's head, slippage of the frames down the user's nose due to gravity, adjustment of the position of the virtual representation of the spectacles with the user's hand, or the like) to provide more information to the user about how a particular pair of spectacles will fit and/or behave while being worn.

Figure 11:
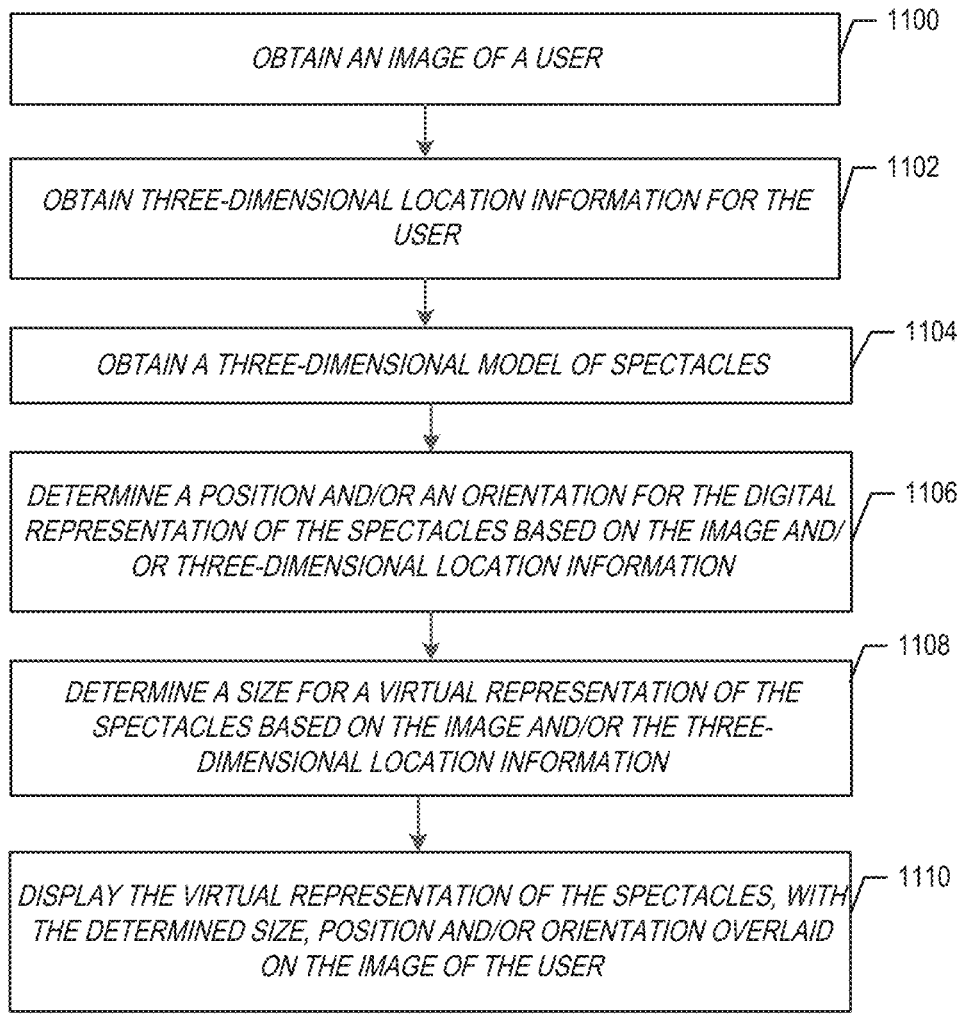
FIG. 11 illustrates an example process for virtual try-on of spectacles, according to certain aspects of the disclosure.

FIG. 11 illustrates a flow diagram of an example process for virtual try-on of spectacles, in accordance with one or more implementations. For explanatory purposes, the process of FIG. 11 is primarily described herein with reference to one or more devices of FIGS. 1 and 2 (particularly with reference to try-on servers 130 and/or user devices 110), which may be executed by one or more processors of the servers 130 and/or user devices 110 of FIG. 1. However, the process of FIG. 11 is not limited to servers 130 and/or user devices 110, and one or more blocks (or operations) of the process may be performed by one or more other components of other suitable devices. Further for explanatory purposes, the blocks of the process of FIG. 11 are described herein as occurring in series, or linearly. However, multiple blocks of the process of FIG. 11 may occur in parallel. In addition, the blocks of the process of FIG. 11 need not be performed in the order shown and/or one or more blocks of the process of FIG. 11 need not be performed and/or can be replaced by other operations.

At block 1100, an image of a user may be obtained. For example, an image such as image 200 of FIG. 2 may be captured using a camera such as camera 205 of user device 110.

At block 1102, three-dimensional location information for the user may be obtained. For example, the three-dimensional location information may include measurement point absolute three-dimensional locations 211, a three-dimensional model 213 of the user based on the measurement point absolute three-dimensional locations 211, and/or facial landmark absolute locations 215 as described herein. The three-dimensional location information may be obtained, for example, using an additional sensor such as sensor 209 and/or a light source such as light source 207 (see, e.g., FIGS. 2 and 13).

At block 1104, a three-dimensional model of spectacles such as spectacles 300 is obtained. The three-dimensional model of the spectacles may be obtained from a database of models (e.g., one of databases 142 of FIG. 1), each corresponding to a real-world pair of spectacles, the models stored at try-on server 130 or another server. Obtaining the three-dimensional model of the spectacles may include downloading the three-dimensional model of the spectacles from the server to user device 110 (e.g., if try-on operations are performed at the user device).

At block 1106, a position and/or an orientation for the digital representation of the spectacles is determined based on the image, three-dimensional location information for the user, and/or the three-dimensional model of the spectacles. Determining the position and/or the orientation for the digital representation of the spectacles may include performing physical placement operations as described above in connection with, for example, FIGS. 7A-7D and 8A-8D and as further described hereinafter in connection with FIG. 12. The physical placement operations may include a combination of one or more iterative collision detection (intersection) and binary position search operations, and may include one or more high-fidelity position-improvement operations.

At block 1108, a size for a virtual representation of the spectacles is determined based on the image, the three-dimensional location information for the user, and/or the three-dimensional model of the spectacles. The determined size may be a pixel size, in image pixels, that accurately corresponds to the real-world size of the spectacles relative to the user's face. For example, determining the size may include determining, using the three-dimensional location information, a physical size of the face of the user; determining, using the image and the determined physical size, a size of the face of the user in image pixels; determining a pixel size for each image pixel in the image using the determined physical size and the size of the face of the user in image pixels; and determining, based on a known size of the spectacles and the determined pixel size, the size of the virtual representation of the spectacles (e.g., in pixels) for the determined position and/or orientation.

At block 1110, a combined image is displayed in which, for example, the virtual representation of the spectacles, with the determined size, position and/or orientation is overlaid on the image of the user for display (e.g., using display 201 of user device 110) as illustrated in, for example, FIG. 4.

Figure 12:
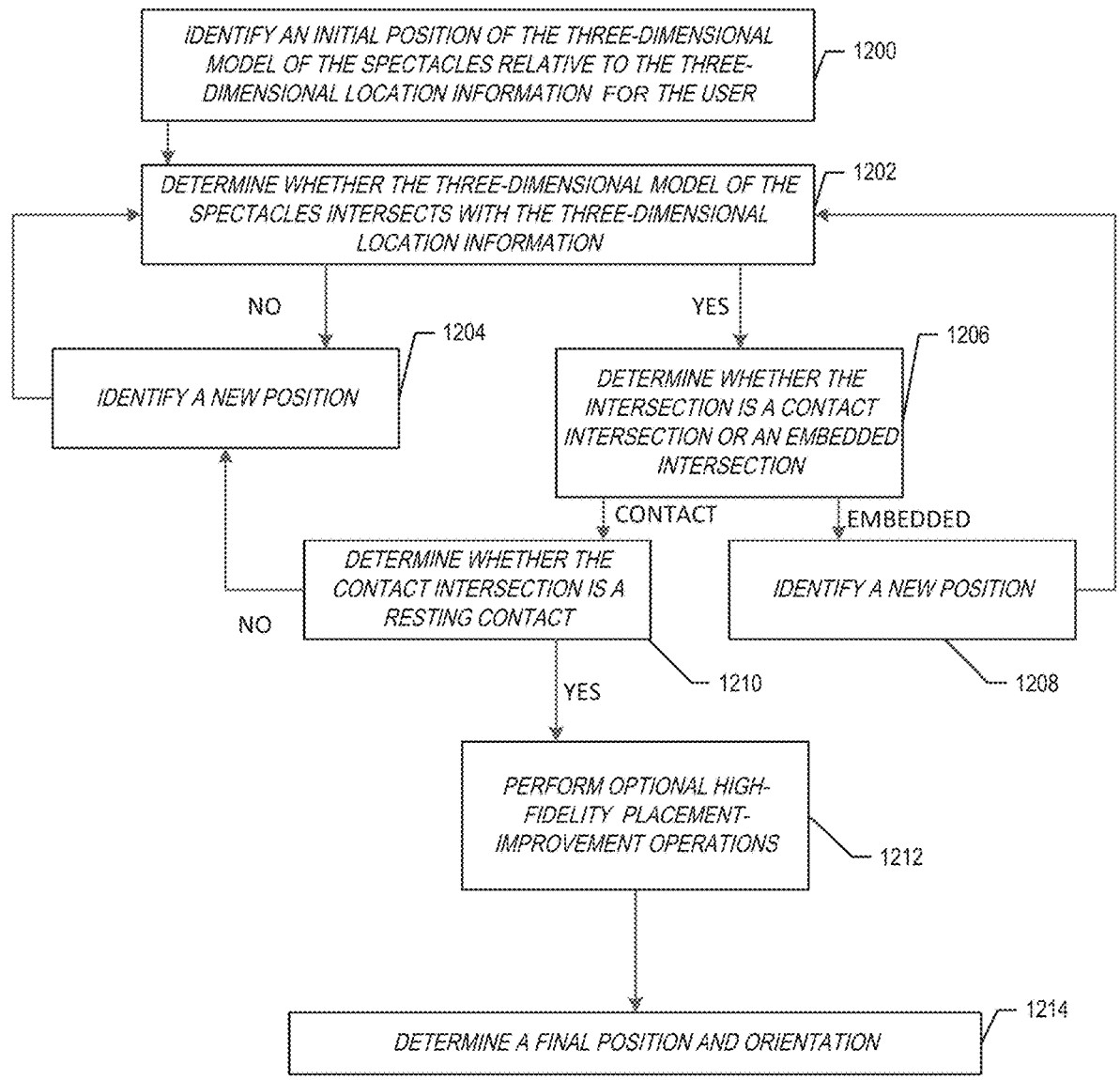
FIG. 12 illustrates an example process for determining a position for a virtual representation of spectacles, according to certain aspects of the disclosure.

FIG. 12 illustrates a flow diagram of an example process for the determination of the position and/or orientation of a virtual representation of spectacles as described in connection with block 1108 of FIG. 11, in accordance with one or more implementations. For explanatory purposes, the process of FIG. 12 is primarily described herein with reference to one or more devices of FIGS. 1 and 2 (particularly with reference to try-on servers 130 and/or user devices 110), which may be executed by one or more processors of the servers 130 and/or user devices 110. However, the process of FIG. 12 is not limited to servers 130 and/or user devices 110, and one or more blocks (or operations) of the process may be performed by one or more other components of other suitable devices. Further for explanatory purposes, the blocks of the process of FIG. 12 are described herein as occurring in series, or linearly. However, multiple blocks of the process of FIG. 12 may occur in parallel. In addition, the blocks of the process of FIG. 12 need not be performed in the order shown and/or one or more blocks of the process of FIG. 12 need not be performed and/or can be replaced by other operations.

At block 1200, an initial position (e.g., an initial test position) of the three-dimensional model of the spectacles, relative to the three-dimensional location information for the user, is identified. The initial position may have a zero x offset and a fixed y or z offset as described above in connection with FIGS. 7A or 8A.

At block 1202, user device 110 and/or try-on servers 130 determines whether the three-dimensional model of the spectacles intersects with the three-dimensional location information for the user. Determining whether the three-dimensional model of the spectacles intersects with the three-dimensional location information for the user may include performing a collision detection operation between the three-dimensional model of the spectacles and the three-dimensional location information for the user (e.g., by determining whether the three-dimensional model of the spectacles, at the initial position, intersects with any of the measurement locations 211, the three-dimensional model 213, or the facial landmark locations 215).

If it is determined that there is no intersection (e.g., the virtual representation of the glasses would appear to float away from the user's face in image 200), at block 1204 a new test position for the three-dimensional model of the spectacles (in the facial coordinate system) may be determined. Determining the new test position may include performing a binary position search operation, incrementally moving the three-dimensional model of the spectacles toward the origin of the facial coordinate system, or otherwise determining a new test position (e.g., pseudo-randomly). Following identification of the new test position, the operations of block 1202 may be repeated with the new test position.

If it is determined (at block 1204) that the three-dimensional model of the spectacles intersects with the three-dimensional location information for the user, user device 110 and/or try-on servers 130 determine, at block 1206, whether the intersection is a contact intersection (e.g., as illustrated in FIGS. 7D, 8D, and 9), or an embedded intersection (e.g., as illustrated in FIGS. 6, 7A, and 8A). A contact intersection may be determined by detection of a single contact point, or by determining that all contact points are at outer edges of both models (as examples). An embedded intersection may be determined by determining that an internal point in one of the three-dimensional models is in contact with a portion of the other model.

If it is determined (at block 1206) that the intersection is an embedded intersection (e.g., as illustrated in FIGS. 6, 7A, and 8A), at block 1208 a new test position for the three-dimensional model of the spectacles (in the facial coordinate system) may be determined. Determining the new test position may include performing a binary position search operation, incrementally moving the three-dimensional model of the spectacles toward the origin of the facial coordinate system, or otherwise determining a new test position (e.g., pseudo-randomly). Following identification of the new test position at block 1208, the operations of block 1202 may be repeated with the new test position.

If it is determined (at block 1206) that the intersection is a contact intersection (e.g., as illustrated in FIGS. 7D, 8D, and 9), user device 110 and/or try-on servers 130 may proceed directly to block 1214 and identify the current test position as final position for display at block 1110, or at block 1210, user device 110 and/or try-on servers 130 may determine whether the contact position is a resting contact position (e.g., or an unstable contact position). For example, the contact intersection may include contact between bridge 308 and the sellion 208 of the user or between nose pads 310 and bridge portions 212 of the user's nose, in which case the contact may be determined to be a stable or resting contact. In other examples, the contact intersection may be contact between bottom portions 314 of frames 302 before contact with bridge 308 or nose pads 310, which may indicate an unstable contact.

If, at block 1210, the contact intersection is determined not to be a resting contact, user device 110 and/or try-on servers 130 may return to block 1204 at which a new test position for the three-dimensional model of the spectacles (in the facial coordinate system) is determined. If additional test positions are used following detection of a contact intersection at block 1206, the additional test positions may be selected using the binary search or other pre-contact algorithm, or may be selected to avoid embedding and/or to avoid separation of the contact point of the contact intersection until at least one other contact point takes over control of the position of the spectacles relative to the user's face (e.g., by virtually sliding the bottom portions of the frames along the users face until the nose pad or bridge make contact). Following identification of the new test position, the operations of blocks 1202, 1206, and 1210 may be repeated with the new test position, or if the new test position has been selected to maintain contact and avoid embedding, user device 110 and/or try-on servers 130 may return directly to block 1210 with the new test position.

If it is determined (at block 1210) that the intersection is a contact intersection (e.g., as illustrated in FIGS. 7D, 8D, and 9), user device 110 and/or try-on servers 130 may proceed directly to block 1214 and identify the current test position as final position for display at block 1110, or at block 1212, user device 110 and/or try-on servers 130 may perform high-fidelity placement-improvement operations (e.g., as described above in connection with FIG. 10).

At block 1210, the current position and orientation of the three-dimensional model of the spectacles in the facial coordinate system may be identified as the final position for display of virtual representation 400 at block 1110 (e.g., as in the example of FIG. 4 above).

Although various examples are described herein as being carried out in a facial coordinate system as shown in FIG. 5, it should be appreciated that any of the various physical placement operations can be performed in any coordinate system (e.g., in the spectacles coordinate system or another coordinate system).

Figure 13:
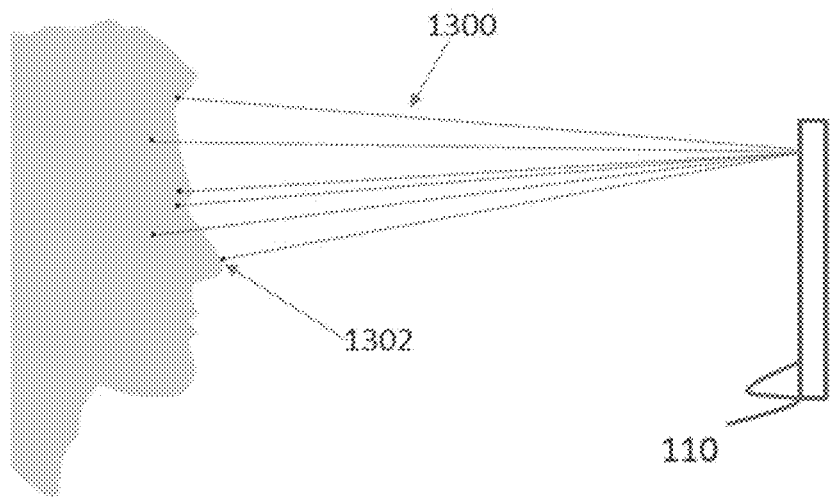
FIG. 13 is a schematic diagram illustrating obtaining absolute measurement locations for a user, according to certain aspects of the disclosure.
Figure 14:
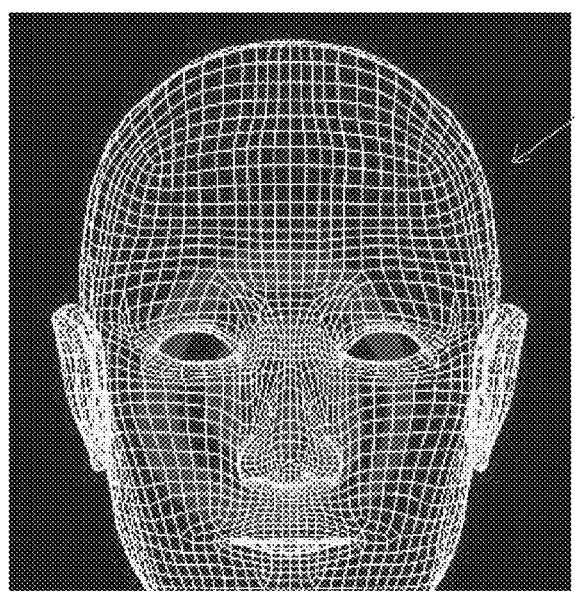
FIG. 14 is a schematic diagram illustrating a two-dimensional rendering of a three-dimensional model of a user, according to certain aspects of the disclosure.
Figure 15:
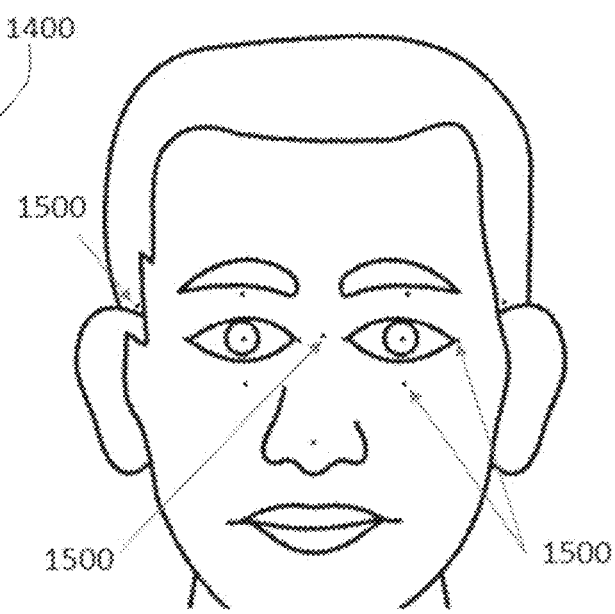
FIG. 15 is a schematic diagram illustrating facial landmark absolute locations for a user, according to certain aspects of the disclosure.

It is described above in connection with, for example, FIGS. 1, 2, 11, and 12 that user device 110 and/or try-on servers 130 may obtain, generate, and/or store measurement point absolute three-dimensional locations 211 for a user in a captured image 200, a three-dimensional model 213 of the user based on the measurement point absolute three-dimensional locations 211, and/or facial landmark absolute locations 215. FIGS. 13, 14, and 15 illustrate, respectively, the measurement point absolute three-dimensional locations 211, the three-dimensional model 213 of the user based on the measurement point absolute three-dimensional locations 211, and the facial landmark absolute locations 215.

FIG. 13 illustrates how user device 110 (e.g., using light source 207) may generate multiple light beams such as infrared beams 1300 that reflect from various incidence locations 1302 on the user's face, in one exemplary implementation for the three-dimensional sensor 209 of FIG. 1. Each beam 1300 generates a spot at the incidence location 1302 with a size and a distortion that is determined by the distance to that location and the shape of the surface at that location. Using the known beam sizes for beams 1300, and an infrared image of the spots captured by sensor 209 (implemented as an infrared sensor in this example), the distances to each incidence location 1302 can be determined. Each incidence location 1302 may represent a measurement point absolute three-dimensional location 211.

FIG. 14 illustrates a two dimensional rendering 1400 of three-dimensional model 213 of the user (e.g., at the time of capture of image 200) based on the measurement point absolute three-dimensional locations 211. Rendering 1400 may be generated by drawing points and/or lines defined by reference points and/or mathematical functions connecting the reference points that define the model. The model may be stored by storing the reference points, mathematical functions, parameter values for the mathematical functions, and/or other model data, whether or not the model is ever rendered for viewing. The model itself can be intersected with the three-dimensional model of spectacles 300 without rendering of either model.

FIG. 15 illustrates representations 1500 of various facial landmark absolute locations 215. The facial landmark absolute locations 215 may be a selected subset of measurement point absolute three-dimensional locations 211 at various facial landmarks, may be averaged or interpolated from two or more of measurement point absolute three-dimensional locations 211, or may be derived or extracted from three-dimensional model 213. In some scenarios in which facial landmark absolute locations 215 are derived directly (e.g., via averaging, interpolation, or other combination) from measurement point absolute three-dimensional locations 211, three-dimensional model 213 may be generated based on facial landmark absolute locations 215 as input data points. Facial landmarks for which absolute three-dimensional locations can be determined include, but are not limited to, the sellion, endocanthion, exocanthion, tragion, zygion, otobasion superius, orbitale superius, palpebrale superius, palpebrale inferius, center point of the pupil, glabella, frontotemporale, maxillofrontalle, orbitale, tragion, nasion, pronasale, and menton.

Hardware Overview

Figure 16:
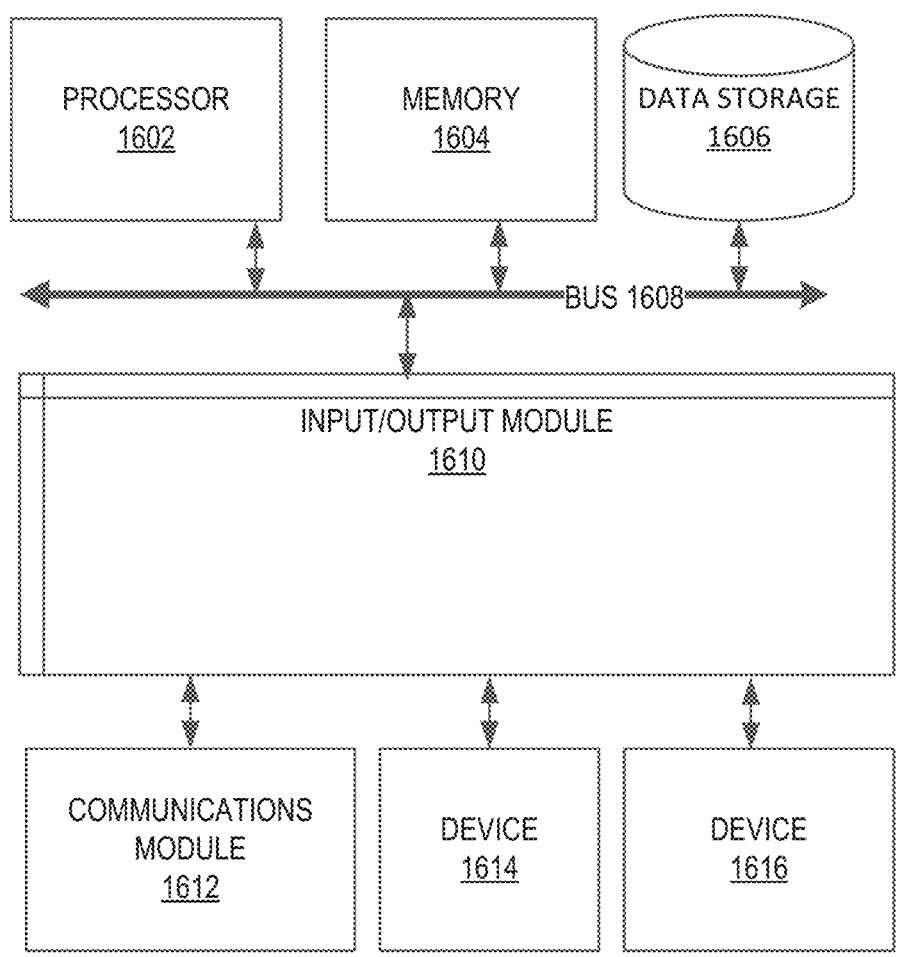
FIG. 16 is a block diagram illustrating an example computer system with which the user device, try-on server, and/or third-party server of FIG. 1 can be implemented, according to certain aspects of the disclosure.

FIG. 16 is a block diagram illustrating an exemplary computer system 1600 with which the user device 110, try-on server(s) 130, and/or third-party server 140 of FIG. 1 can be implemented. In certain aspects, the computer system 1600 may be implemented using hardware or a combination of software and hardware, either in a dedicated server, or integrated into another entity, or distributed across multiple entities.

Computer system 1600 includes a bus 1608 or other communication mechanism for communicating information, and a processor 1602 coupled with bus 1608 for processing information. By way of example, the computer system 1600 may be implemented with one or more processors 1602. Processor 1602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1600 can include, in addition to hardware, code that creates an execution environment for the computer program in question, e.g., code that constitutes processor firmware, a protocol stack, a database management system, an operating system, or a combination of one or more of them stored in an included memory, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1608 for storing information and instructions to be executed by processor 1602. The processor 1602 and the memory 1604 can be supplemented by, or incorporated in, special purpose logic circuitry.

The instructions may be stored in the memory 1604 and implemented in one or more computer program products, i.e., one or more modules of computer program instructions encoded on a computer readable medium for execution by, or to control the operation of, the computer system 1600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1604 may also be used for storing temporary variable or other intermediate information during execution of instructions to be executed by processor 1602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1600 further includes a data storage device 1606 such as a magnetic disk or optical disk, coupled to bus 1608 for storing information and instructions. Computer system 1600 may be coupled via input/output module 1610 to various devices. The input/output module 1610 can be any input/output module. Exemplary input/output modules 1610 include data ports such as USB ports. The input/output module 1610 is configured to connect to a communications module 1612. Exemplary communications modules 1612 include networking interface cards, such as Ethernet cards and modems. In certain aspects, the input/output module 1610 is configured to connect to a plurality of devices, such as an input device 1614 and/or an output device 1616. Exemplary input devices 1614 include a keyboard and a pointing device (e.g., a mouse or a trackball), by which a user can provide input to the computer system 1600. Other kinds of input devices 1614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1616 include display devices, such as a LCD (liquid crystal display) or light-emitting diode (LED) display, for displaying information to the user.

According to one aspect of the present disclosure, user device 110, try-on servers 130, and/or third-party server 140 can be implemented using a computer system 1600 in response to processor 1602 executing one or more sequences of one or more instructions contained in memory 1604. Such instructions may be read into memory 1604 from another machine-readable medium, such as data storage device 1606. Execution of the sequences of instructions contained in main memory 1604 causes processor 1602 to perform the process steps described herein. One or more processors in a multi-processing arrangement may also be employed to execute the sequences of instructions contained in memory 1604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component (e.g., as a data server), or that includes a middleware component (e.g., an application server), or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication (e.g., a communication network). The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1600 can include clients and servers. A client and server are generally remote from each other and typically interact through a communication network. The relationship of client and server arises by virtue of computer programs running on the respective computers and having a client-server relationship to each other. Computer system 1600 can be, for example, and without limitation, a desktop computer, laptop computer, or tablet computer. Computer system 1600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 1602 for execution. Such a medium may take many forms, including, but not limited to, non-volatile media, volatile media, and transmission media. Non-volatile media include, for example, optical or magnetic disks, such as data storage device 1606. Volatile media include dynamic memory, such as memory 1604. Transmission media include coaxial cables, copper wire, and fiber optics, including the wires that comprise bus 1608. Common forms of machine-readable media include, for example, a floppy disk, a flexible disk, a hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
    capturing, with a camera, an image of a face of a user;
    determining three-dimensional location information for a plurality of points associated with the face of the user in the image;
    identifying at least one landmark associated with the face of the user in the image, the at least one landmark corresponding to at least one of the plurality of points;
    determining a size of a virtual representation of a first pair of spectacles based on the three-dimensional location information and a three-dimensional model of the first pair of spectacles;
    determining a position of the virtual representation of the first pair of spectacles 1a intersecting at least one point of the three-dimensional model of the first pair of spectacles with a first location in the image based on the at least one landmark in a facial coordinate system having an origin at the at least one landmark; and
    displaying, on a display, a combined image including the image of the face of the user and the virtual representation of the first pair spectacles with the determined size and at the determined position.

2. The computer-implemented method of claim 1, wherein the size and the position of the virtual representation of the first pair of spectacles are respectively determined to accurately represent the size of the first pair of spectacles and the position of the first pair of spectacles in the combined image, as the first pair of spectacles would appear if physically placed on the face of the user.

3. The computer-implemented method of claim 1, wherein determining the size of the first pair of spectacles comprises:
    determining, using the three-dimensional location information, a physical size of the face of the user;
    determining, using the image and the determined physical size, a size of the face of the user in image pixels;
    determining a pixel size for each image pixel in the image using the determined physical size and the size of the face of the user in image pixels; and
    determining, based on a known size of the first pair of spectacles and the determined pixel size, the size of the virtual representation of the first pair of spectacles.

4. The computer-implemented method claim 3, wherein determining the position of the virtual representation of the first pair of spectacles comprises:
    determining a type of the first pair of spectacles; and
    determining a second location in the image that is offset from the at least one landmark associated with the face of the user by a distance that is based on the type of the first pair of spectacles.

5. The computer implemented method of claim 4, wherein the type of the first pair of spectacles includes an acetate frame.

6. The computer-implemented method of claim 4, wherein the type of the first pair of spectacles includes a metal frame with nose pads on adjustable arms that extend from the metal frames.

7. The computer-implemented method of claim 4, further comprising:
    superimposing the virtual representation of the first pair of spectacles on the face of the user in the image by intersecting at least one point of the three-dimensional model of the first pair of spectacles with the second location in the image.

8. The computer-implemented method of claim 7, wherein the at least one landmark includes a sellion.

9. The computer-implemented method of claim 1, wherein the three-dimensional location information for the user comprises at least one of: a plurality of measurement point absolute three-dimensional locations, a three-dimensional model of the user, and a plurality of facial landmark absolute locations.

10. The computer-implemented method of claim 1, wherein determining three-dimensional location information for a plurality of points associated with the face of the user in the image includes using an additional camera, the method further comprising:
generating, with a light source of the electronic device, a plurality of light beams, at least some of which are directed at the face of the user; and
capturing a second image of the face of the user using the additional camera, while the at least some of the light beams are directed at the face of the user.

11. The computer-implemented method of claim 10, further comprising determining the plurality of measurement point absolute three-dimensional locations based on reflections of the at least some of the light beams in the captured second image.

12. The computer-implemented method of claim 1, wherein determining three-dimensional location information for a plurality of points associated with the face of the user in the image includes using an additional camera, the method further comprising:
capturing an additional image of the face of the user using the additional camera; and
generating the three-dimensional location information for the face of the user based on a known distance between the camera and the additional camera and a parallax effect between the image and the additional image.

13. The computer-implemented method of claim 1, wherein determining three-dimensional location information for a plurality of points associated with the face of the user in the image includes using a sensor, the sensor comprises at least one of a time-of-flight sensor, a laser range finder, a motion sensor, a proximity sensor, a structured light sensor, and an additional camera.

14. A computer-implemented method, comprising:
capturing an image of a face of a user;
determining a three-dimensional model of the face of the user at a time of capture of the image;
identifying at least one landmark associated with the face of the user in the image, the at least one landmark corresponding to at least one point of the three-dimensional model of the face of the user;
obtaining a three-dimensional model of a first pair of spectacles;
determining a size for a virtual representation of the first pair of spectacles based on the three-dimensional model of the user at the time of capture of the image and the three-dimensional model of the first pair of spectacles;
determining a position for the virtual representation of the first pair of spectacles by intersecting at least one point of the three-dimensional model of the first pair of spectacles with a first location in the image based on the at least one landmark in a facial coordinate system having an origin at the at least one landmark; and
displaying the virtual representation of the first pair of spectacles, with the determined size and at the determined position, overlaid on the image of the face of the user.

15. The computer-implemented method of claim 14, wherein:
the origin of the facial coordinate system is at a sellion of the three-dimensional model of the user at the time of capture of the image;
an x axis of the facial coordinate system extends between a left side and a right side of the three-dimensional model of the user at the time of capture of the image, where a positive x axis extends from the origin toward the left side of the three-dimensional model of the user at the time of capture of the image;
a y axis of the facial coordinate system extends orthogonally to the x axis and between a top and a bottom of the three-dimensional model of the user at the time of capture of the image, where a positive y axis extends from the origin toward the top of the three-dimensional model of the user at the time of capture of the image; and
a z axis extends orthogonally to the x axis and they axis between a front and a back of the three-dimensional model of the user at the time of capture of the image, where a positive z axis extends from the origin toward the front of the three-dimensional model of the user at the time of capture of the image.

16. The computer-implemented method of claim 15, wherein the first location in the image includes at least one of a y offset along they axis, a zero x-offset along the x axis, and a z offset along the z axis.

17. The computer implemented method of claim 14, further comprising:
obtaining a three-dimensional model of a second pair of spectacles;
determining a size for a virtual representation of the second pair of spectacles based on the three-dimensional model of the user at the time of capture of the image and the three-dimensional model of the second pair of spectacles;
determining a position for the virtual representation of the second pair of spectacles based on the at least one landmark and the three-dimensional model of the second pair of spectacles; and
displaying the virtual representation of the second pair of spectacles, with the determined size and at the determined position, overlaid on the image of the face of the user.

18. The computer-implemented method of claim 17, wherein:
determining the position of the virtual representation of the first pair of spectacles comprises:
determining a type of the first pair of spectacles, and
determining a second location in the image that is offset from the at least one landmark associated with the face of the user by a first distance that is based on the type of the first pair of spectacles; and
determining the position of the virtual representation of the second pair of spectacles comprises:
determining a type of the first pair of spectacles, and
determining a third location in the image that is offset from the at least one landmark associated with the face of the user by a second distance that is based on the type of the second pair of spectacles.

19. The computer-implemented method of claim 18, wherein the first distance is different from the second distance.

20. The computer-implemented method of claim 19, wherein first pair of spectacles includes an acetate frame and the second pair of spectacles includes a metal frame with nose pads on adjustable arms that extend from the metal frames.

21. The computer-implemented method of claim 20, wherein the at least one landmark includes a sellion.

22. The computer-implemented method of claim 14, wherein the three-dimensional model of the first pair of spectacles is obtained from a server.

23. A computer-implemented method, comprising:
capturing, with a camera, an image of a face of a user;
determining three-dimensional location information for a plurality of points associated with the face of the user in the image;
identifying at least one landmark associated with the face of the user in the image, the at least one landmark corresponding to at least one of the plurality of points;
determining a size of a virtual representation of a first pair of spectacles based on the three-dimensional location information and a three-dimensional model of the first pair of spectacles, wherein determining the size of the virtual representation of the first pair of spectacles comprises:
   determining, using the three-dimensional location information, a physical size of the face of the user;
   determining, using the image and the determined physical size, a size of the face of the user in image pixels;
   determining a pixel size for each image pixel in the image using the determined physical size and the size of the face of the user in image pixels;
   determining, based on a known size of the first pair of spectacles and the determined pixel size, the size of the virtual representation of the first pair of spectacles;
determining a position of the virtual representation of the first pair of spectacles based on the at least one landmark associated with the face of the user and the three-dimensional model of the first pair of spectacles; and
displaying, on a display, a combined image including the image of the face of the user and the virtual representation of the first pair spectacles with the determined size and at the determined position.

24. A computer-implemented method, comprising:
capturing an image of a face of a user;
determining a three-dimensional model of the face of the user at a time of capture of the image;
identifying at least one landmark associated with the face of the user in the image, the at least one landmark corresponding to at least one point of the three-dimensional model of the face of the user;
obtaining a three-dimensional model of a first pair of spectacles;
determining a size for a virtual representation of the first pair of spectacles based on the three-dimensional model of the user at the time of capture of the image and the three-dimensional model of the first pair of spectacles;
determining a position for the virtual representation of the first pair of spectacles based on the at least one landmark and the three-dimensional model of the first pair of spectacles, wherein determining the position of the virtual representation comprises intersecting at least one point of the three-dimensional model of the first pair of spectacles with a location in the image based on the at least one landmark in a facial coordinate system having an origin at the at least one landmark, and wherein the origin of the facial coordinate system is at a sellion of the three-dimensional model of the user at the time of capture of the image, an x axis of the facial coordinate system extends between a left side and a right side of the three-dimensional model of the user at the time of capture of the image, where a positive x axis extends from the origin toward the left side of the three-dimensional model of the user at the time of capture of the image, a y axis of the facial coordinate system extends orthogonally to the x axis and between a top and a bottom of the three-dimensional model of the user at the time of capture of the image, where a positive y axis extends from the origin toward the top of the three-dimensional model of the user at the time of capture of the image, and a z axis extends orthogonally to the x axis and the y axis between a front and a back of the three-dimensional model of the user at the time of capture of the image, where a positive z axis extends from the origin toward the front of the three-dimensional model of the user at the time of capture of the image; and
displaying the virtual representation of the first pair of spectacles, with the determined size and at the determined position, overlaid on the image of the face of the user.

* * * * *